United States Patent
Wagner et al.

(10) Patent No.: US 12,480,968 B2
(45) Date of Patent: Nov. 25, 2025

(54) METHOD FOR THE CONTACTLESS DETERMINATION OF AN OPERATING STATE

(71) Applicant: KAESER KOMPRESSOREN SE, Coburg (DE)

(72) Inventors: Florian Wagner, Neuffen (DE); Tobias Sprügel, Coburg (DE); Patrick Jahn, Coburg (DE)

(73) Assignee: KAESER KOMPRESSOREN SE, Colburg (DE)

( * ) Notice: Subject to any disclaimer, the term of this patent is extended or adjusted under 35 U.S.C. 154(b) by 18 days.

(21) Appl. No.: 18/557,366

(22) PCT Filed: Apr. 27, 2021

(86) PCT No.: PCT/EP2021/060955
§ 371 (c)(1),
(2) Date: Oct. 26, 2023

(87) PCT Pub. No.: WO2022/228656
PCT Pub. Date: Nov. 3, 2022

(65) Prior Publication Data
US 2024/0142488 A1    May 2, 2024

(51) Int. Cl.
*G01R 23/16* (2006.01)
*G01P 3/48* (2006.01)

(52) U.S. Cl.
CPC ..................... *G01P 3/48* (2013.01)

(58) Field of Classification Search
CPC ..... G01R 23/16; G01R 15/181; G01R 31/343
See application file for complete search history.

(56) References Cited

U.S. PATENT DOCUMENTS

| | | | |
|---|---|---|---|
| 6,144,924 | A | 11/2000 | Dowling et al. |
| 2008/0174255 | A1 | 7/2008 | Schnetzka et al. |

(Continued)

FOREIGN PATENT DOCUMENTS

| | | |
|---|---|---|
| CN | 110346594 A | 10/2019 |
| DE | 102008001183 A1 | 10/2009 |

(Continued)

OTHER PUBLICATIONS

International Search Report and Written Opinion corresponding to PCT/EP2021/060955; Date of Mailing: Feb. 3, 2022 (16 pages, including English translation of ISR).

(Continued)

*Primary Examiner* — Alesa Allgood
(74) *Attorney, Agent, or Firm* — Myers Bigel, P.A.

(57) ABSTRACT

The invention relates to a method for the determination, in particular for contactless determination, of an operating state of a compressor (1) and/or a rotational speed of a compressor drive (2), in particular of a variable-speed or fixed-speed compressor drive (2), having the following method steps:
 detecting a magnetic field over a time range by means of a detection element (3), wherein the magnetic field is generated by a current of at least one phase (L1, L2, L3) of a power supply cable (4);
 determining the frequency spectrum of the magnetic field over the time range;
 analyzing the frequency spectrum of the magnetic field in order to determine an operating state of the compressor (1) and/or in order to determine a rotational speed of the compressor drive (2).

20 Claims, 18 Drawing Sheets

(56) References Cited

U.S. PATENT DOCUMENTS

| | | |
|---|---|---|
| 2010/0299090 A1 | 11/2010 | Hobelsberger et al. |
| 2017/0077857 A1 | 3/2017 | Chretien et al. |
| 2018/0045784 A1* | 2/2018 | Gajanayake ........ G01R 33/1215 |
| 2020/0158116 A1 | 5/2020 | Esberger et al. |

FOREIGN PATENT DOCUMENTS

| | | | |
|---|---|---|---|
| DE | 212017000273 U1 | 7/2019 | |
| DE | 102019217740 B3 | 4/2021 | |
| EP | 2988187 B1 | 3/2017 | |
| EP | 3143418 A1 | 3/2017 | |
| JP | 2016189689 A | 11/2016 | |
| JP | 2020527018 A | 8/2020 | |
| WO | 2011107109 A1 | 9/2011 | |
| WO | WO-2013093800 A1 * | 6/2013 | ........... G01R 31/343 |
| WO | 2015173662 A1 | 11/2015 | |
| WO | 2019014435 A1 | 1/2019 | |
| WO | 2020039661 A1 | 2/2020 | |
| WO | 2020046537 A1 | 3/2020 | |
| WO | 2021074248 A1 | 4/2021 | |

OTHER PUBLICATIONS

Ceban, et al., "Study of Rotor Faults in Induction Motors Using External Magnetic Field Analysis", IEEE Transactions on Industrial Electronics, 59(5), 2011, 2082-2093.

European Office Action corresponding to EP 21722796.6; Dated: May 15, 2025 (English translation not available), (7 pp).

Japanese Office Action (including English translation) corresponding to JP 2023-565941; Mailed: May 20, 2025, (9 pp).

Jonetzko, et al., "High Frequency Non-Intrusive Electric Device Detection and Diagnosis", 2015 International Conference on Smart Cities and Green ICT Systems (SMARTGREENS), Lisbon, Portugal, 2015, 1-8.

Decision of Refusal (including English machine translation) issued in corresponding application JP 2023-565941; Received: Oct. 17, 2025, (4 pp).

* cited by examiner

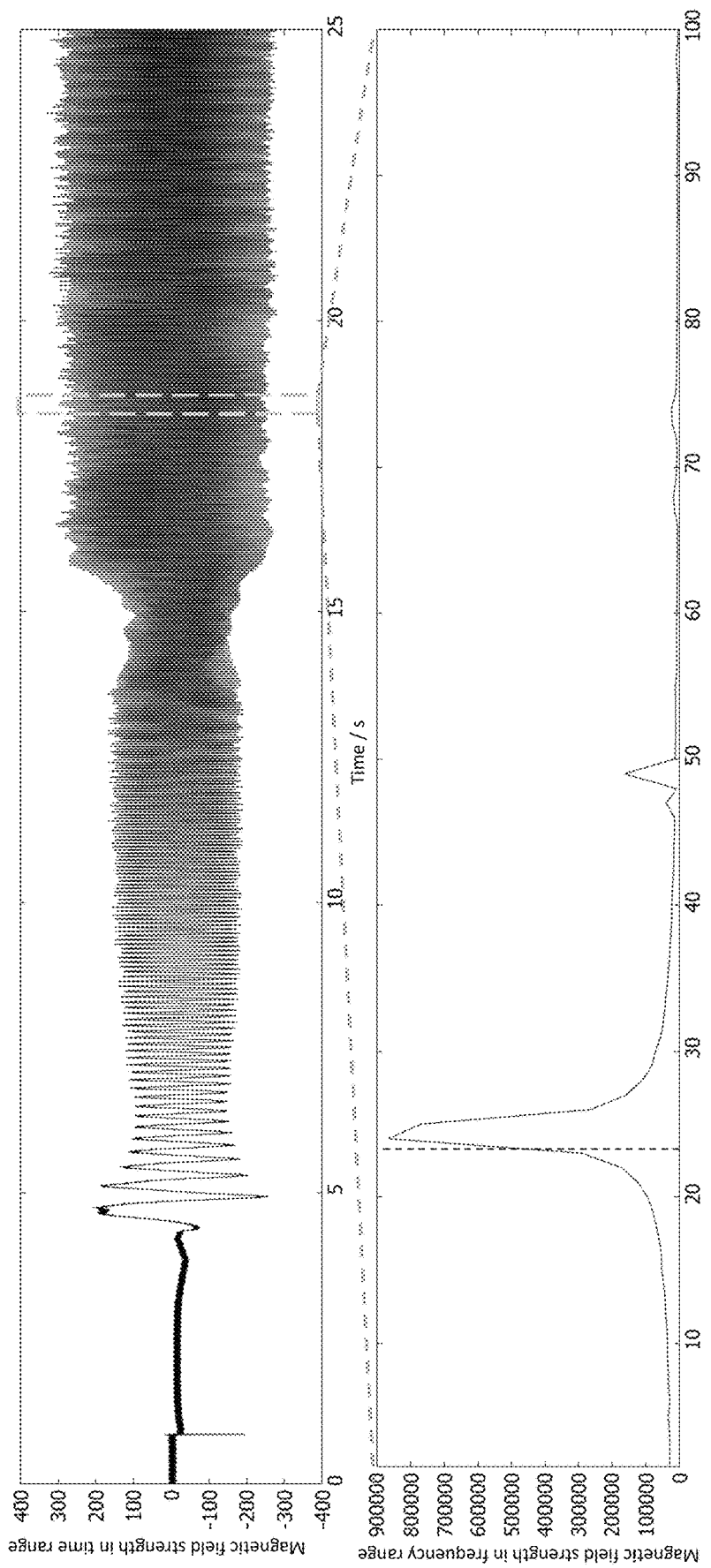

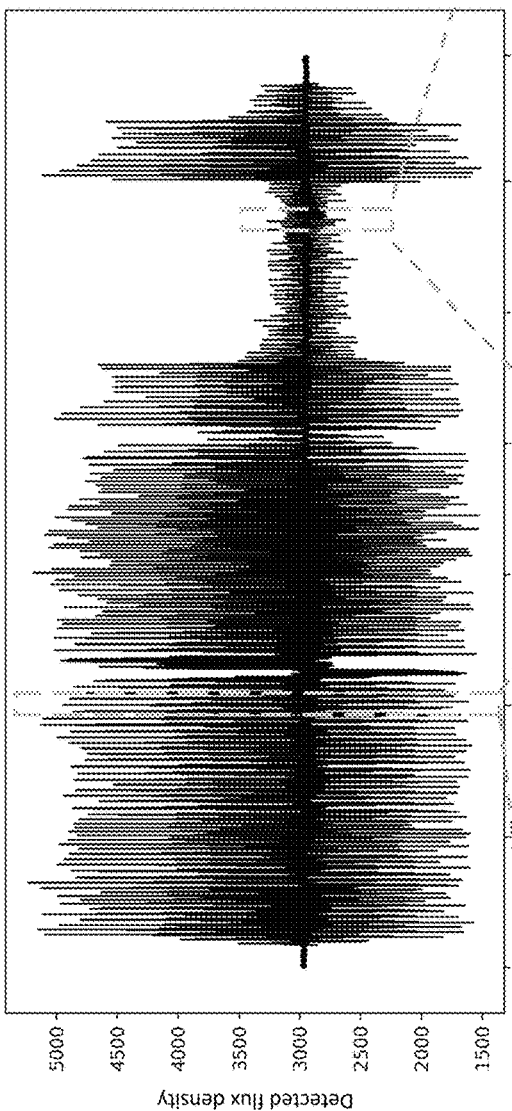
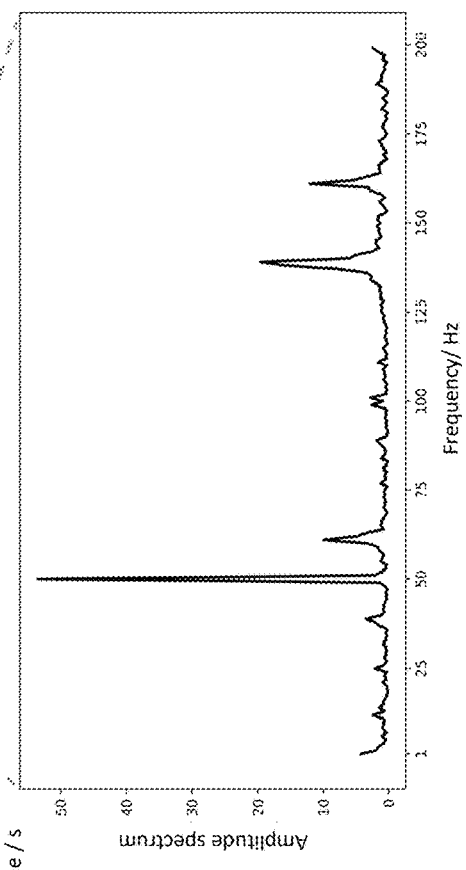
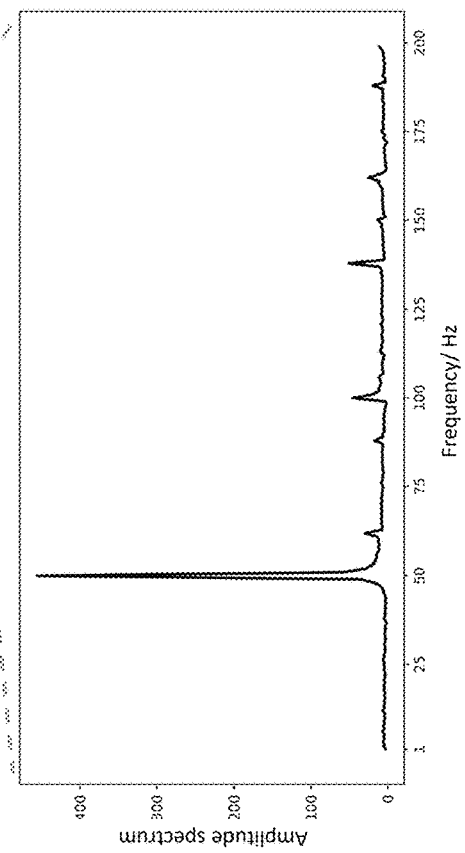

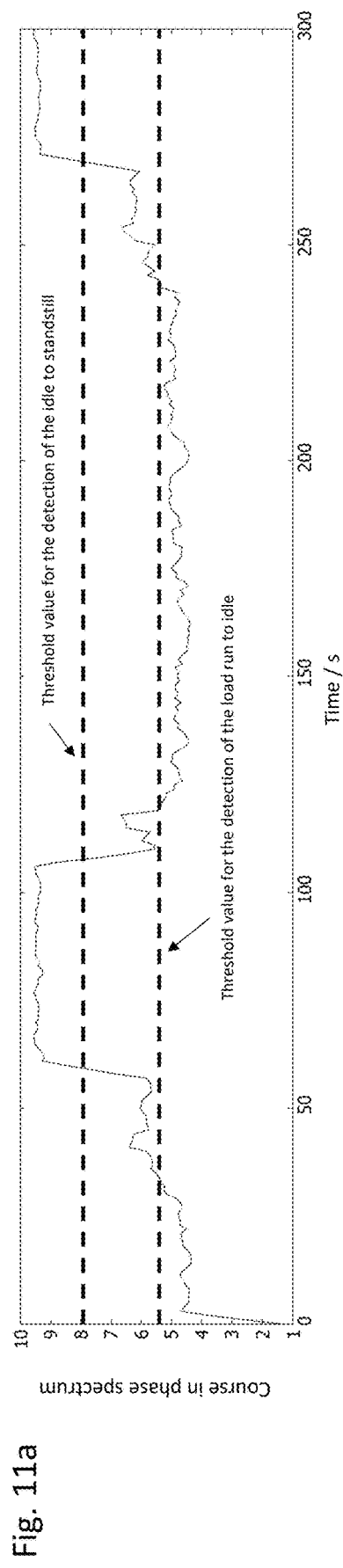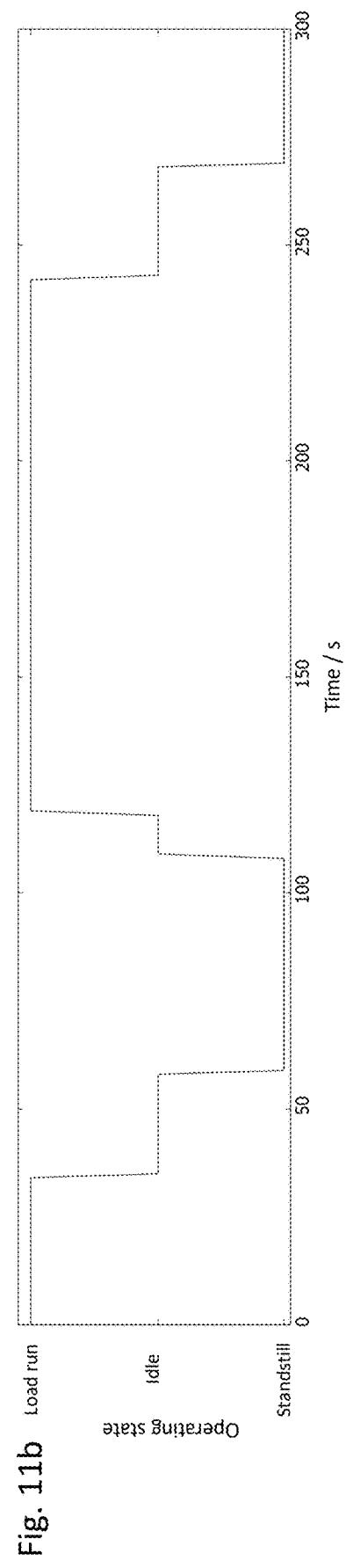

METHOD FOR THE CONTACTLESS DETERMINATION OF AN OPERATING STATE

RELATED APPLICATION

This application is a 35 U.S.C. § 371 national stage application of PCT Application No. PCT/EP2021/060955, filed Apr. 27, 2021, the contents of which are incorporated herein by reference in its entirety. The above-referenced PCT International Application was published in the German language as International Publication No. WO 2022/228656 A1 on Nov. 3, 2022.

DESCRIPTION

The invention relates to a method for the determination, in particular for contactless determination, of an operating state of a compressor and/or a rotational speed of a compressor drive. The invention also relates to a device for carrying out a method according to the invention.

For the monitoring, analysis, diagnosis or control of compressors, many problems arise from the need for different parameters of the compressor, such as the temporal course of the operating state (standstill, idling, load run), the delivery volume flow and the electrical power consumption.

The information needed to determine these parameters can be supplied, for example, by the controller of the compressor via a communication interface such as Ethernet, Modbus or Profibus.

However, this is often not the case with known compressors, since, for example, compressors are used without a controller and/or without a corresponding communication interface. Also, the communication interface may work with a proprietary and/or encrypted protocol, which provides the corresponding data only for the manufacturer of the compressor.

It is known from the prior art to tap signals by installing measuring equipment in or on the compressor, on the basis of which the required parameters are derived.

For example, the detection of the signals "motor running" and "load" is known. For this purpose, the positions or the control commands for the mains contactor, i.e. the information as to whether the compressor drive is supplied with electrical energy, and the electric contactor for the control of the inlet valve, i.e. the information as to whether air is flowing unhindered into the compressor, i.e. whether air is being delivered, are tapped via potential-free contacts in a control cabinet of a compressor. From the detected position of the mains contactor and the electric contactor for controlling the inlet valve, the standstill, idling and load run operating states of the compressor can be distinguished in combination.

This prior art method of tapping the signals has several disadvantages. On the one hand, the electrical system in the control cabinet of the compressor is interfered with in order to connect the potential-free contacts. This intervention requires specially trained personnel, also referred to as electrically instructed personnel, since the connection of the signals takes place in the control cabinet of the compressor. Also, the installation for tapping the signals cannot take place while the compressor is running, as the potential-free contacts are connected to live parts. The compressor must therefore be disconnected from the electrical mains. Also, for compressors with variable-speed compressor drive, the rotational speed of the compressor drive cannot be determined via the signals "motor running" and "load".

It is also known from the prior art to use the reflex pulse counting method for determining the rotational speed. In reflex pulse counting, reflective markers are placed on the shaft between the compressor drive and the compressor. An optical sensor counts the number of pulses per time unit of the rotating shaft. The number of pulses per time unit is proportional to the rotational speed of the shaft. This means that the number of pulses can be used to infer the rotational speed of the shaft and thus the rotational speed of the compressor drive.

However, this type of speed determination has the disadvantage that the reflective markers can only be attached to the shaft when the machine is at a standstill. In addition, attaching the optical sensor requires time, as vibrations of the compressor during operation can cause the optical sensor to slip. Therefore, the optical sensor must be attached via a solid mechanical attachment. Another disadvantage is that although the rotational speed of the compressor drive can be determined by reflex pulse counting, it is not possible to distinguish between the operating states "standstill", "idling" and "load run". It is only possible to distinguish between "standstill" (speed 0 rpm) or "non-standstill" (speed greater than 0 rpm).

Another method known from the prior art is the active current measurement at the supply line of the compressor drive via a current clamp or a Rogowski coil. The basic idea of this type of signal detection is to determine the active current at one of the phases L1, L2 or L3 without contact by measuring the magnetic field strength. For this purpose, the effect is used that the magnetic field strength around a current-carrying conductor is proportional to the current strength in the conductor. The position of the signal acquisition for a compressor with a fixed-speed drive and a compressor with a variable-speed drive are shown in FIGS. 1 and 2.

The signal acquisition in this method known from the prior art is carried out in such a way that the RMS value of the current intensity over one or more waves of the alternating current is calculated from the measured value of the current intensity (alternating current) tapped at the phase via the magnetic field strength. The RMS value of the current intensity of an alternating current represents the equivalent current intensity of a direct current. Based on the RMS value of the alternating current, the "standstill", "idling" and "load run" operating states can be distinguished by thresholding. The relationship between the magnetic field strength, the RMS value of the current and the operating state is shown by way of example in FIG. 3.

In the example of FIG. 3 as known from the prior art, a threshold value of 30 A was used for the derivation of the operating state for the detection of the "idling" operating state and a threshold value of 160 A for the detection of the "load run" operating state. These two values must be taken from the data sheet of the respective compressor or calculated based on values from the data sheet. Consequently, this prior-art method requires a very precise measurement of the RMS value of the current.

This method, known from the prior art, has the additional disadvantage that the control cabinet of the compressor must be opened for the installation of the current clamp or the Rogowski coil, since the current clamp or the Rogowski coil must be placed around a single phase. This is basically only possible in the control cabinet. This means that electrically trained personnel are required for the installation. It is also not possible to determine the rotational speed of the compressor drive by this method. This is because the current intensity depends not only on the rotational speed but also on the back pressure at the compressor outlet and the phase shift between current and voltage. For the same electrical power consumption, a different current may be required due to a different phase shift (expressed via the active power factor cos φ).

It is therefore the object of the present invention to design a method which eliminates or at least minimizes the disadvantages known from the prior art. In particular, it is an object of the present invention to provide a reliable, fast and inexpensive detection of the operating state of the compressor and/or the rotational speed of the compressor drive.

In particular, the object is solved by a method for the determination, in particular for contactless determination, of an operating state of a compressor and/or a rotational speed of a compressor drive, in particular of a variable-speed or fixed-speed compressor drive, comprising the following method steps:

detecting a magnetic field over a time range by means of a detection element, wherein the magnetic field is generated by a current of at least one phase of a power supply cable;

determining the frequency spectrum of the magnetic field over the time range;

analyzing the frequency spectrum of the magnetic field to determine an operating state of the compressor and/or to determine a speed of the compressor drive.

In the context of the present invention, the term "contactless" is to be understood in particular as meaning that there is no electrical contact. A mechanical contact can certainly exist.

In the context of the present invention, the term "current" more particularly describes an alternating current or three-phase current.

In the context of the present invention, the term "compressor" is particularly, but not exclusively, meant to include compressors and related machinery, such as blowers and the like. It is also common for a compressor to include, but not be limited to, a compressor block, wherein the compressor block is driven by a compressor drive, for example an electric motor, in particular an electric motor having one, two or more pairs of poles.

In the context of the present invention, the term "power supply cable" is particularly, but not exclusively, understood to mean a cable for supplying power to the compressor and/or a cable for supplying power to the compressor drive. It is also possible that the power supply cable supplies power to further electrical components of the compressor. Such further components could be, for example, fan motors, valves, a machine controller or the like.

In particular, it is noted that in the context of the present invention, a neutral conductor, when energized, is considered to be a phase.

In the context of the present invention, the term "detecting a magnetic field" particularly, but not exclusively, describes detecting one or more magnetic characteristics. This magnetic characteristic may be an absolute value at a point in time or a plurality of absolute values in a time range. It is also possible that a temporal development of the magnetic characteristic is detected within a time range. Likewise, the term "detecting a magnetic field" may be understood to mean the ratio of absolute measured values to one another in a specific time range. In particular, according to an advantageous idea of the invention, the physical quantities of the magnetic field can also be detected without units and, optionally, further processed or indicated (also in the representation in the figure part of the application). What is relevant is the relation of the numerical values to each other. Therefore, a linear scaling of the axes is preferably also used in the representation.

One advantage of the method according to the invention is that, based on the analysis of the frequency spectrum of the magnetic field, the rotational speed of the compressor drive and/or the operating state of the compressor can be determined. A further advantage of the method according to the invention is that the exact value of the magnetic characteristic and/or the magnitude of the RMS value of the current is not required in order to determine the rotational speed of the compressor drive and/or the operating state of the compressor. In this respect, it is possible to work with recorded values for magnetic characteristics and/or magnitude of RMS value, since their relative change over time appears sufficient for the analysis according to the invention. Also, it is not so important at which exact position of the generated magnetic field these values are recorded, since also in this respect only their relative change over time is important.

Consequently, these parameters do not have to be determined with high constructive effort as is usual in the prior art. Rather, it is possible that, for example, a determination of an operating state of the compressor and/or a determination of a rotational speed of the compressor drive is carried out by comparing the magnetic characteristics recorded within a time range with one another. As a result of the method according to the invention, a simpler determination of the rotational speed of the compressor drive and/or a simplified determination of the operating state of the compressor is possible. Furthermore, the method according to the invention enables a determination of the rotational speed of the compressor drive and/or a determination of the operating state of the compressor without precise knowledge of the characteristic values of the compressor and/or the compressor drive. Consequently, the method according to the invention is also suitable for already installed compressors or compressor drives.

In one embodiment, detecting the magnetic field comprises detecting a magnetic field strength, in particular using a Rogowski coil, and/or detecting a magnetic flux density, in particular using a Hall sensor or a magnetoresistive sensor.

An advantage of this embodiment is that devices known from the prior art and, in the case of the Hall sensor, inexpensive devices can be combined with the method according to the invention. Likewise, it is possible that the direction of a magnetic vector and/or the magnitude of a magnetic vector is detected.

In a further embodiment, the method according to the invention comprises the following method step of:

attaching the detection element to a phase of the power supply cable.

An advantage of this embodiment is that the detection element can be variably attached to a phase of the power supply cable. For example, in the case of a compressor with a frequency converter, the detection element is attached between the frequency converter and the compressor drive, in particular when a speed is determined. In the case of a fixed-speed compressor, and similarly in the case of an operating state determination for a compressor with a frequency converter, the detection element may be placed anywhere in the power supply to the compressor drive. For example, the detection element may be placed in the compressor supply line or directly in front of the main drive motor or anywhere in between.

According to one embodiment, the method according to the invention comprises the following step of:

attaching the detection element to a plurality of phases, in particular all phases, of the power supply cable in such a way as to measure the magnetic field generated by the current of the plurality of phases, in particular all phases, of the power supply cable.

An advantage of this embodiment is that the detection element can be variably attached to a plurality of phases, in particular all phases of the power supply cable. Consequently, the magnetic field generated by the current of the plurality of phases of the power supply cable is measured. It is sufficient for the method according to the invention that the detection element is attached to a plurality of phases. The need for mechanical separation of the individual phases of the power supply cable is eliminated, which in particular simplifies the attachment of the detection element, since this does not have to be attached to a specific phase.

In one embodiment, the analysis of the frequency spectrum comprises an analysis of the time course of the magnetic field.

An advantage of this embodiment is that the method according to the invention can be used variably.

Advantageously, the frequency components contained in the time course of the magnetic field are analyzed using a Fourier analysis and/or a wavelet analysis and/or a Görtzel algorithm.

An advantage of this embodiment is that the method according to the invention can be combined with mathematical methods known from the prior art. This is particularly advantageous in the light of a software-technical realization of the method according to the invention, since a reduction in the computational load and memory load can thereby be achieved. It has also been shown that the frequency resolution can be increased by using the Görtzel algorithm. Likewise, it has been shown that the Görtzel algorithm in particular can be efficiently implemented in digital signal processors.

In a further embodiment, the frequency of the magnetic field is determined by analyzing the individual frequency components, and the fundamental frequency of the current of the at least one phase of the power supply cable is determined based on the frequency of the magnetic field.

In the context of the present invention, the term "fundamental frequency" means in particular, but not exclusively, the fundamental frequency of the alternating or three-phase current, in particular the frequency greater than 0 Hz with the highest amplitude.

An advantage of this embodiment is that the magnetic field strength and the magnitude of the RMS value of the current do not have to be known exactly for the method according to the invention. It is solely a matter of finding out at what frequency the magnetic field oscillates. The frequency of the oscillation of the magnetic field is the same frequency at which the three-phase current of the compressor drive rotates.

In a further embodiment, the rotational speed of the compressor drive is determined from the determined fundamental frequency of the current, in particular by using a factor.

An advantage of this embodiment is that the rotational speed of the compressor drive can be reliably determined. For example, a compressor drive with one pole pair is assumed to have a factor of "1", while a compressor drive with two pole pairs is assumed to have a factor of "2". In general, this relationship can be represented as speed=frequency/number of pole pairs.

In a further embodiment, exactly one phase of the power supply cable is detected in the step of detecting.

An advantage of this embodiment is that methods known from the prior art can be used for mounting the detection element. This means that no new training of the personnel is necessary, which reduces the costs for an operator of a compressor.

According to a further embodiment, a plurality of phases, in particular all phases, of the power supply cable are detected in the step of detecting.

An advantage of this embodiment is that the magnetic field, which is generated in total by several, in particular all phases of the power supply cable, is detected. The prior art assumes that no magnetic field can be detected in this case, since in theory the magnetic fields of the individual currents in the symmetrically loaded phases cancel each other out. However, it has been found that the phases are not symmetrically loaded, resulting in so-called leakage currents between the individual phases (and likewise a possibly present neutral conductor). These leakage currents also generate a magnetic field, the field strength of which can be detected. This magnetic field and in particular the magnetic characteristics are orders of magnitude lower than the magnetic field and the magnetic characteristics when measuring a single phase. However, the magnetic field and also the magnetic characteristics and in particular their qualitative temporal course can be reliably detected. This makes it possible for the magnetic field to be detected at points on the power supply cable for which electrically trained personnel are not required. An example of such a location is the interior of the machine at the compressor drive supply cable before the compressor drive terminal box. In the case of a compressor with a fixed-speed compressor drive, the detecting of the magnetic field may even take place outside the compressor in an electrical supply line. It is also possible that not only the phases of the power supply cable of the compressor or the compressor drive are detected, but also a possibly present neutral conductor of the power supply cable.

In a further advantageous embodiment, a phase spectrum of the magnetic field, in particular in a defined time range, is evaluated to determine the operating state and/or the rotational speed.

An advantage of this embodiment is that the determination of the operating state and/or the rotational speed is improved. This is due to the fact that the phase spectra in the different operating states and/or the different rotational speeds differ significantly from each other.

In a further embodiment, an amplitude spectrum of the magnetic field, in particular in a defined time range, is evaluated to determine the operating state and/or the rotational speed.

An advantage of this embodiment is that the determination of the operating state and/or the rotational speed is improved. This is due to the fact that the amplitude spectra in the different operating states and/or the different rotational speeds differ significantly from each other.

In one embodiment, the time range is 200 ms to 20 s, preferably 300 ms to 10 s, more preferably 500 ms to 5 s, particularly 750 ms to 3 s, especially 1 s.

An advantage of this embodiment is that the time range can be selected according to the requirements of the compressor and the realization of the method according to the invention.

In a further embodiment, the phase spectrum of the magnetic field is automatically evaluated, in particular by forming the variance of the phase spectrum in a frequency range from 0 Hz to 10 kHz, preferably 0 Hz to 1 kHz, particularly preferably in a range around an excitation frequency.

An advantage of this embodiment is that, depending on the compressor drive, the frequency range in which the phase spectrum is evaluated can be adjusted accordingly. In this respect, it has been shown that a frequency range of 0 Hz to 10 KHz is suitable for a high-speed compressor drive, a frequency range of 0 to 1 kHz is suitable for a non-high-speed compressor drive, and a frequency range around the excitation frequency, in particular around 50 Hz or 60 Hz with a variance of ±5 Hz, is suitable for a fixed-speed compressor drive.

In a further embodiment, the amplitude spectrum of the magnetic field is automatically evaluated, in particular by forming the variance of the amplitude spectrum in a frequency range from 0 Hz to 10 kHz, preferably 0 Hz to 1 kHz, particularly preferably in a range around an excitation frequency.

An advantage of this embodiment is that, depending on the compressor drive, the frequency range in which the amplitude spectrum can be evaluated can be adjusted accordingly. In this respect, it has been shown that a frequency range of 0 Hz to 10 KHz is suitable for a high-speed compressor drive, a frequency range of 0 to 1 kHz is suitable for a non-high-speed compressor drive, and a frequency range around the excitation frequency, in particular around 50 Hz or 60 Hz with a variance of ±5 Hz, is suitable for a fixed-speed compressor drive.

In a further embodiment, the frequency range is a multiple, in particular a multiple of 2 to 10 times the excitation frequency.

An advantage of this embodiment is that the frequency range can be selected accordingly depending on the hardware or software available for scanning.

According to a further embodiment, the operating state of the compressor is determined based on the frequency spectrum of the magnetic field using a clustering method and/or a classification method.

An advantage of this embodiment is that it allows automatic determination of the operating state of the compressor.

In a further embodiment, the clustering method and/or the classification method uses thresholds or a statistical method, in particular k-means and/or neural networks.

An advantage of this embodiment is that largely automated methods can be used for both the cluster method and the classification method. This means in particular an improvement of the determination of the operating state of the compressor.

In a further embodiment, the classification method comprises three classifications, in particular the classifications standstill, idling and load run.

An advantage of this embodiment is that it provides a concrete realization of the classification method.

Another embodiment describes that each classification is defined based on the level of a statistical parameter.

An advantage of this embodiment is that the statistical parameter, for example the variance, the average, the modal value and the like, can be calculated quickly and reliably, in particular in a software implementation of the method according to the invention.

In a further embodiment, the operating state of the compressor and/or the rotational speed of the compressor drive is determined by analyzing the amplitude spectrum of the magnetic field in the frequency range of an excitation frequency.

An advantage of this embodiment is that an alternative determination method for the operating state of the compressor and/or the rotational speed of the compressor drive is provided.

According to a further embodiment, thresholding is performed during the analysis of the amplitude spectrum.

An advantage of this embodiment is that automated detection of the operating state can be performed hereby.

The object is also solved by a device for performing a method according to any of the preceding embodiments, wherein the device comprises:
  a detection element for attachment to at least one phase of a power supply cable, wherein the detection element comprises
  a Rogowski coil, a current clamp, a MEMS magnetometer, and/or a Hall sensor or a magnetoresistive sensor.

By means of the device according to the invention, the advantages of the method are obtained. In particular, an advantage of the device according to the invention is that, on the basis of the analysis of the frequency spectrum of the magnetic field, it is possible to determine the rotational speed of the compressor drive and/or the operating state of the compressor. Another advantage of the device according to the invention is that the exact value of the magnetic characteristic and/or the magnitude of the RMS value of the current are not required in order to determine the rotational speed of the compressor drive and/or the operating state of the compressor. Consequently, these parameters do not have to be determined at high design cost as is common in the prior art. Rather, it is possible that, for example, a determination of an operating state of the compressor and/or a determination of a rotational speed of the compressor drive is carried out by comparing the magnetic characteristics detected within a time range with one another. By means of the device according to the invention, a simpler speed determination of the compressor drive and/or a simplified determination of the operating state of the compressor is possible. Furthermore, the device according to the invention enables a determination of the rotational speed of the compressor drive and/or a determination of the operating state of the compressor without precise knowledge of the characteristic values of the compressor or of the compressor drive. Consequently, the device according to the invention is also suitable for already installed compressors or compressor drives.

In a further embodiment, the detection element comprises at least one sensor unit, wherein the sensor unit comprises at least two of the following sensors: a sensor for detecting a magnetic field strength in an X-direction, a sensor for detecting a magnetic field strength in a Y-direction, or a sensor for detecting a magnetic field strength in a Z-direction.

An advantage of this embodiment is that the at least two sensors enable the magnetic field to be detected independently of the position of the respective sensor unit.

The object is also solved by using a device according to the preceding embodiments for determining a rotational speed of a compressor drive and/or for determining an operating state of a compressor.

By using the device according to the invention, the advantages of the device are obtained.

The object is also solved by the computer-readable medium according to the invention, comprising instructions which, when executed on one or more computing units, implement a method according to one of the preceding embodiments.

The computer-readable medium according to the invention, including computer-executable instructions, provides improved information handling of the method according to the invention.

The invention will be described below by means of several exemplary embodiments which will be explained in more detail with reference to figures, wherein:

FIG. 6 shows an evaluation of a time section of the magnetic field strength in the frequency range (amplitude spectrum) according to the invention;

FIG. 9 shows the detection of the operating state from the detected magnetic flux density (FIG. 9a) in the operating mode "load run" (FIG. 9b) and in the operating mode "idling" (FIG. 9c);

FIGS. 11a and 11b shows a detection of the operating state based on the values of the phase spectrum;

Figure 1:
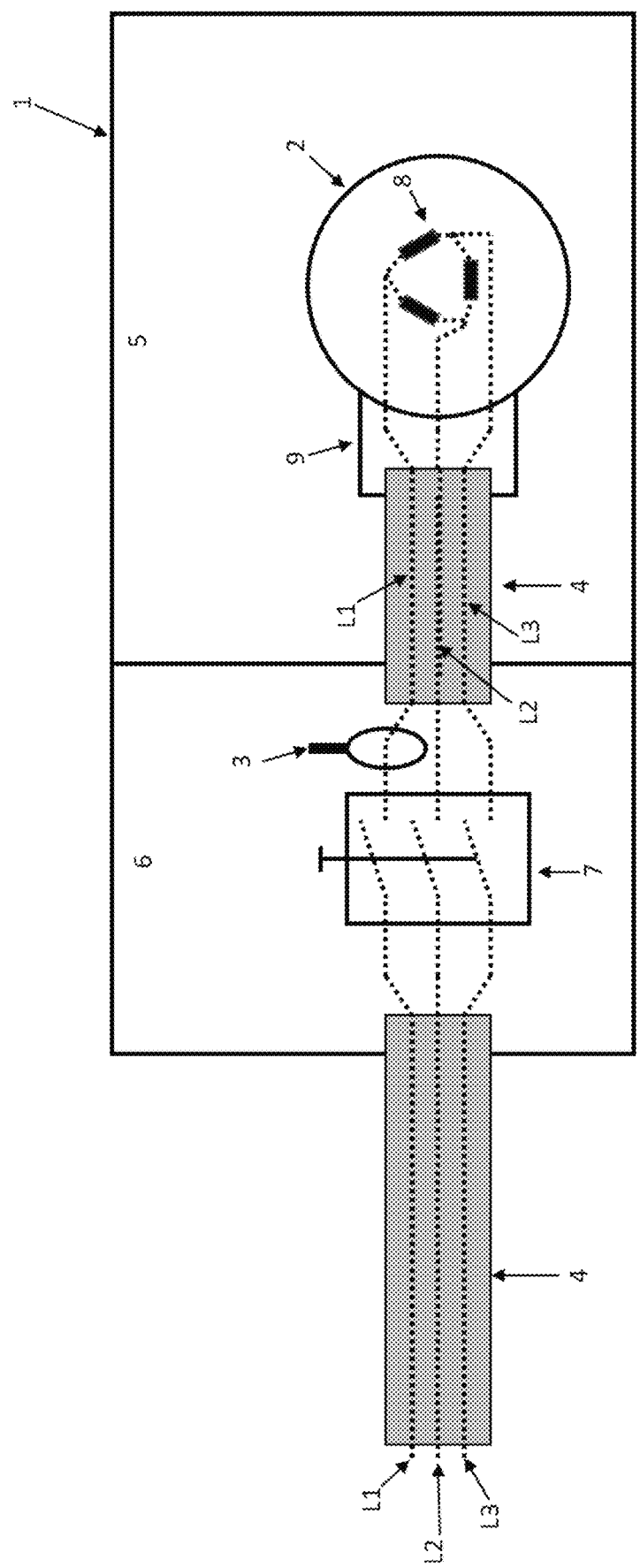
FIG. 1 shows a known prior-art detection of the current intensity at a compressor with a fixed-speed compressor drive.

In particular, it is noted that the present invention is based on detecting the magnetic field of phases L1, L2, L3 induced by the current. However, for the determination of the rotational speed of the compressor drive, the evaluation of the magnetic field strength as an indicator of the current intensity or the RMS value of the current is omitted. Instead, the method according to the invention analyzes the time characteristic of the magnetic field strength with respect to the frequency components contained therein by analyzing the frequency range, for example using Fourier analysis, wavelet analysis, or the Görtzel algorithm. By analyzing the individual frequency components, the frequency of the magnetic field is recognized which is attributable to the fundamental frequency of the three-phase current at which the compressor drive is driven. An example of such a frequency analysis for a time section of the magnetic field strength signal is shown in FIG. 6.

In the following description, the same reference numerals are used for identical and similarly acting parts.

FIG. 1 shows a known prior art for detecting the current intensity at a compressor 1, for example a compressor with a fixed-speed compressor drive 2. The compressor 1 has a compressor drive 2, wherein this is for example an electric motor and has a corresponding motor winding 8. A terminal box 9 is arranged in front of the compressor drive. Both the compressor drive 2, and a part of the power supply cable 4 and the terminal box 9, are accommodated in a machine interior 5. A detection element 3 is attached to one of the phases of the power supply cable 4 after the mains contactor 7, i.e. in the area of the control cabinet 6. As can be seen from FIG. 1, part of the power supply cable 4 extends between the machine interior 5 and the control cabinet 6. FIG. 1 shows an attachment of the detection element 3 to phase L1.

Figure 2:
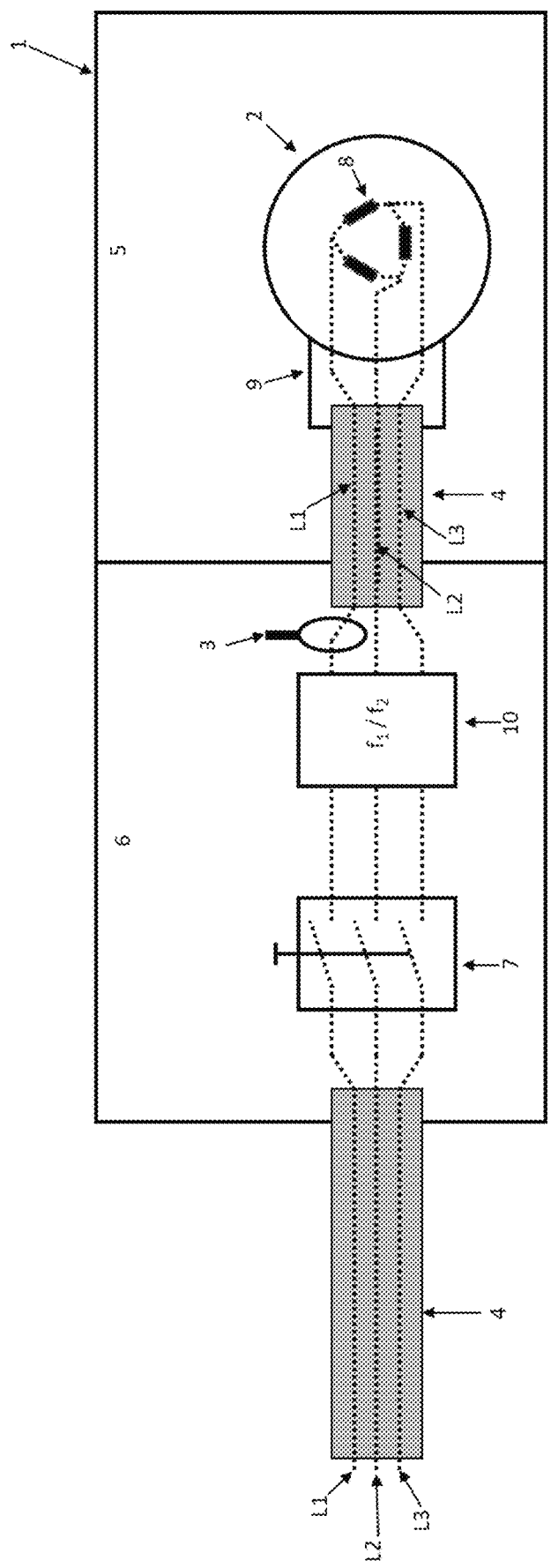
FIG. 2 shows a known prior-art detection of the current intensity at a compressor with variable-speed compressor drive.

FIG. 2 schematically shows a detection of the current intensity, as known from the prior art, at a compressor 1, for example a compressor, with variable-speed compressor drive 2. The detection of the current intensity at the compressor 1 with variable-speed compressor drive 2 differs from the detection of the current intensity at a compressor 1 with fixed-speed compressor drive 2 in that the detection element 3 is attached to one of the phases of the power supply cable 4 after a frequency converter 10. In this respect, the frequency converter 10 is a separate component from the compressor drive 2.

The active current measurement is carried out on the power supply cable 4 of the compressor drive 2 via a detection element 3, for example a current clamp or a Rogowski coil. At one phase of the power supply cable 4, in FIGS. 1 and 2 at phase L1, the active current is determined without contact by measuring the magnetic field strength. For this purpose, the effect that the magnetic field strength around the phase L1 is proportional to the current strength in the phase L1 is used. The possible positioning of the detection element 3 for a compressor with a fixed-speed compressor drive is shown in FIG. 1, while the possible positioning for a compressor with a variable-speed compressor drive is shown in FIG. 2.

Figure 3:
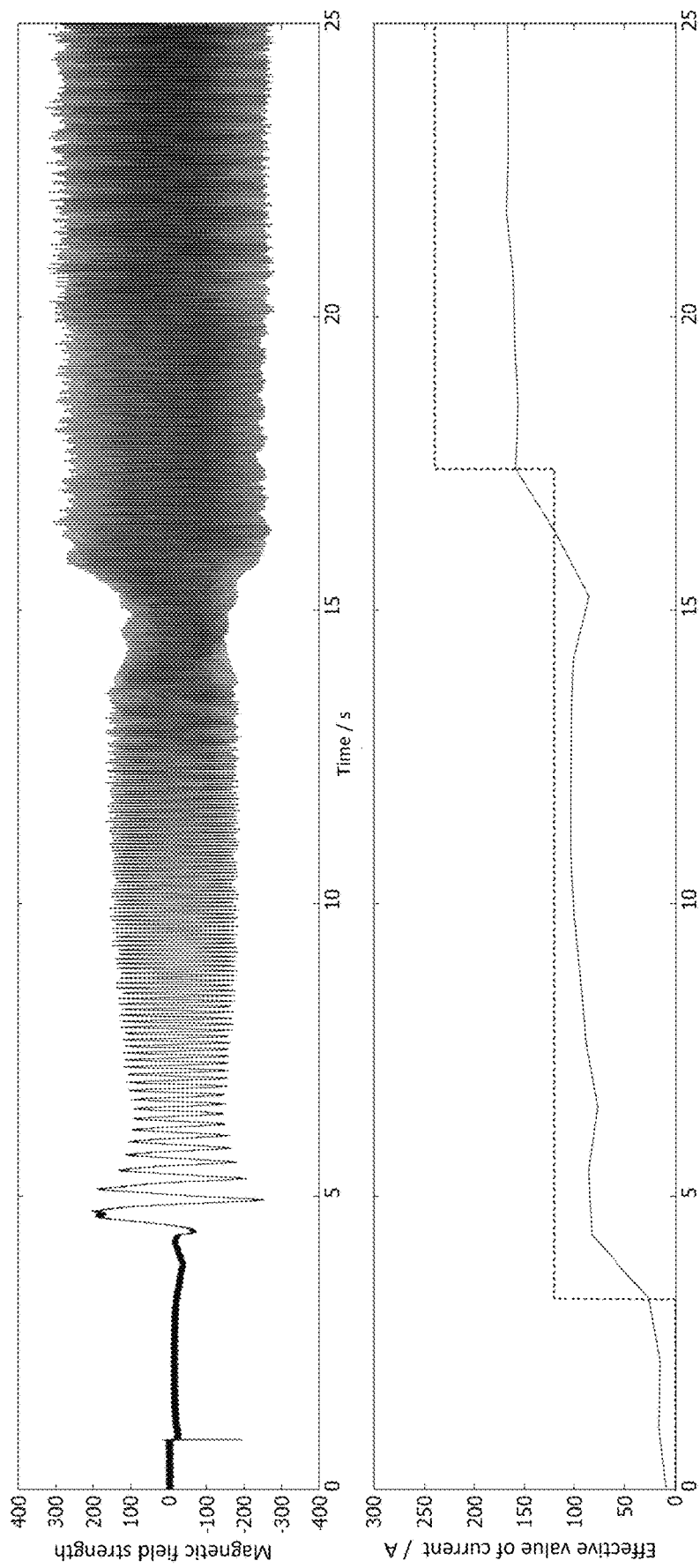
FIG. 3 shows a relationship known from the prior art between the magnetic field strength, the RMS value of the current and the operating state.

FIG. 3 shows the relationship between the magnetic field strength, the RMS value of the current and the operating state as known from the prior art. The upper diagram in FIG. 3 shows the magnetic field strength over time (in seconds).

The lower diagram in FIG. 3 shows the RMS value of the current and the operating state that can be derived from it. The signal acquisition in this method known from the prior art is carried out in such a way that the RMS value of the current intensity over one or more waves of the alternating current is calculated from the measured value of the current intensity (alternating current) tapped at the phase via the magnetic field strength. The RMS value of the current intensity of an alternating current represents the equivalent current intensity of a direct current. Based on the RMS value of the alternating current, the "standstill", "idling" and "load run" operating states can be distinguished by thresholding. The relationship between the magnetic field strength, the RMS value of the current and the operating state is shown by way of example in FIG. 3.

In the example of FIG. 3 as known from the prior art, a threshold value of 30 A was used for the derivation of the operating state for the detection of the "idling" operating state and a threshold value of 160 A for the detection of the "load run" operating state. These two values must be taken from the data sheet of the respective compressor or calculated based on values from the data sheet.

Figure 4:
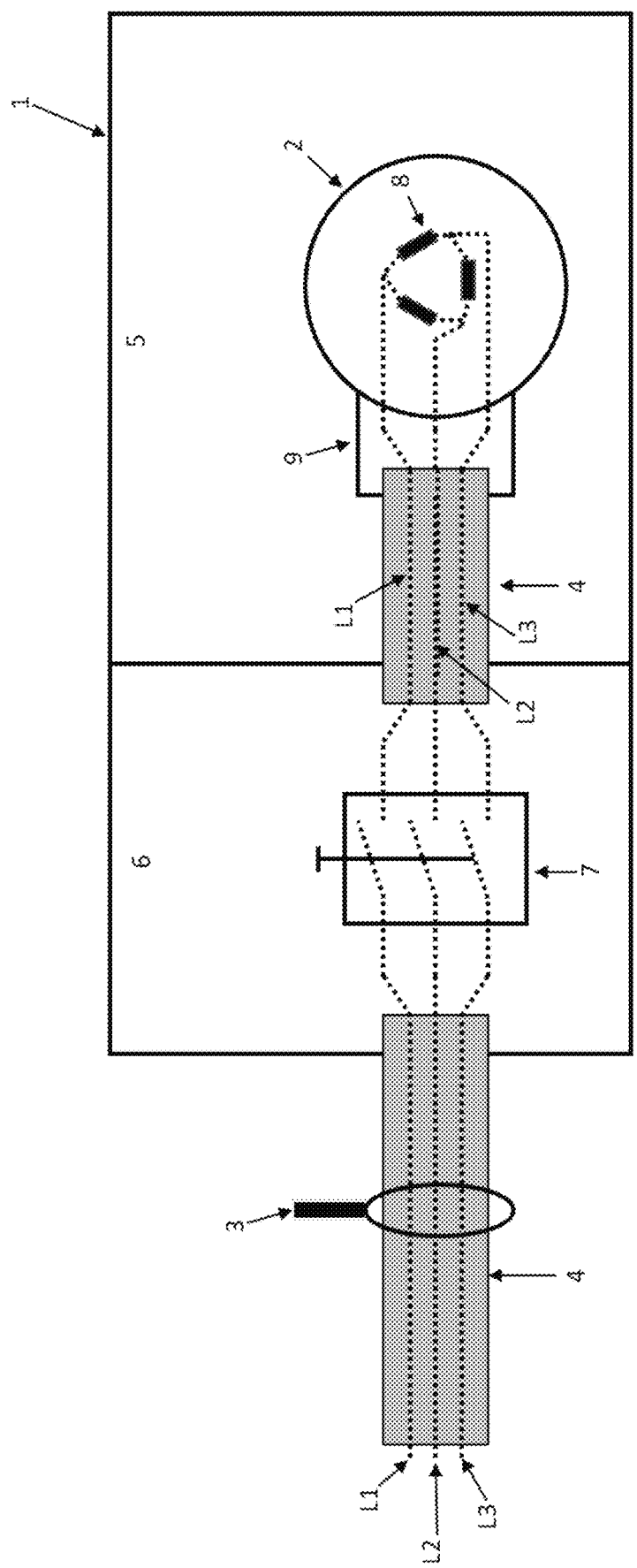
FIG. 4 shows a detection of the magnetic field in a compressor with a fixed-speed compressor drive according to a method according to the invention.

FIG. 4 shows a detection of the magnetic field in a compressor 1 with a fixed-speed compressor drive 2 according to a method according to the invention. Here, an embodiment of the method according to the invention is illustrated in which the detection element 3 detects all phases L1, L2 and L3 of the power supply cable 4. However, it will be understood by the person skilled in the art that the detection element 3 can be arranged in such a way that only one phase is detected, for example phase L1, or phase L2, or phase L3, or a current-carrying neutral conductor which is not illustrated. However, the position of the detection element 3 is fundamentally different from the positioning of FIG. 1. Thus, in the embodiment of FIG. 4, the detection element 3 is positioned outside the control cabinet 6 and outside the machine interior 5. This has the advantage that the detection element 3 can also be fitted by personnel who have not received electrical training.

Figure 5:
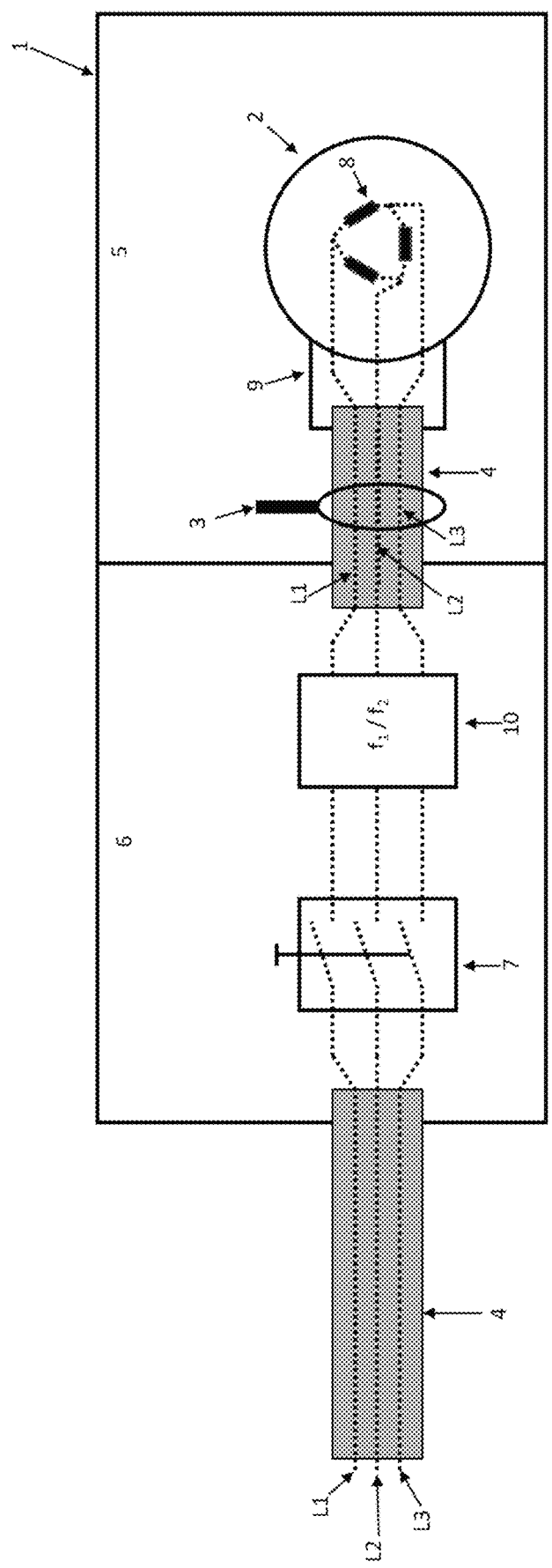
FIG. 5 shows a detection of the magnetic field in a compressor with a variable-speed compressor drive according to a method according to the invention.

FIG. 5 shows a detection of the magnetic field in a compressor 1 with variable-speed compressor drive 2 according to a method according to the invention. Again, an embodiment of the method according to the invention is illustrated in which the detection element 3 detects all phases L1, L2, L3 and a neutral conductor, if any, of the power supply cable 4, which is not illustrated in FIG. 5. However, it will be understood by the person skilled in the art that the detection element 3 can be arranged in such a way that only one phase, for example phase L1, or phase L2, or phase L3, or an optionally present neutral conductor, not shown in FIG. 5, is detected.

The prior art assumes that no magnetic field can be detected in the embodiment shown in FIGS. 4 and 5, since in theory the magnetic fields of the individual currents in the symmetrically loaded phases L1, L2, L3 cancel each other out. However, the applicant has found that the phases L1, L2, L3 are not symmetrically loaded, resulting in so-called leakage currents between the individual phases L1, L2, L3 and/or the neutral conductor (not shown in FIGS. 4 and 5). These leakage currents also generate a magnetic field, the magnetic field strength of which can be detected. This magnetic field and in particular the magnetic field strength are orders of magnitude lower than the magnetic field and magnetic field strength when measuring a single phase L1, L2, L3. The magnetic field and likewise the magnetic field strength and in particular their qualitative temporal course can be reliably detected. It is thus possible that the detection element 3 is placed at positions of the power supply cable 4 for which no electrically instructed personnel is required. An example of such a position is the machine interior 5 at the supply line of the compressor drive 2 in front of the terminal box 9 of the compressor drive 2, as shown for example in FIG. 5. In the case of a compressor 1 with a fixed-speed compressor drive 2, the detection element 3 can even be placed outside the compressor 1 in an electrical supply line, shown in FIG. 4 by the power supply cable 4.

FIG. 6 shows an evaluation of a time section of the magnetic field strength in the frequency range, the so-called amplitude spectrum, according to the invention. By analyzing the individual frequency components, the frequency of the magnetic field is identified which is attributable to the fundamental frequency of the three-phase current with which the compressor drive is driven.

The result of the determination of the magnetic field strength is shown in FIG. 6 above. FIG. 6 below shows an example of a frequency analysis for a time section of the magnetic field strength signal. The time section is indicated by dashed bars in FIG. 6 above.

In FIG. 6 below, i.e. in the amplitude spectrum, there is a clearly pronounced maximum at a frequency of 23.1 Hz. This frequency is exactly the frequency of the three-phase current which supplies the compressor drive 2 with electrical energy via the power supply cable 4. FIG. 6 shows an example of the magnetic field strength and amplitude spectrum for a compressor 1 with variable-speed compressor drive 2. The strength of the magnetic field and/or the magnitude of the RMS value of the current do not play any role for the method according to the invention. Rather, the method according to the invention determines the frequency at which the magnetic field oscillates. This frequency of oscillation of the magnetic field is thereby the same frequency at which the three-phase current of the compressor drive 2 rotates.

Figure 7A:
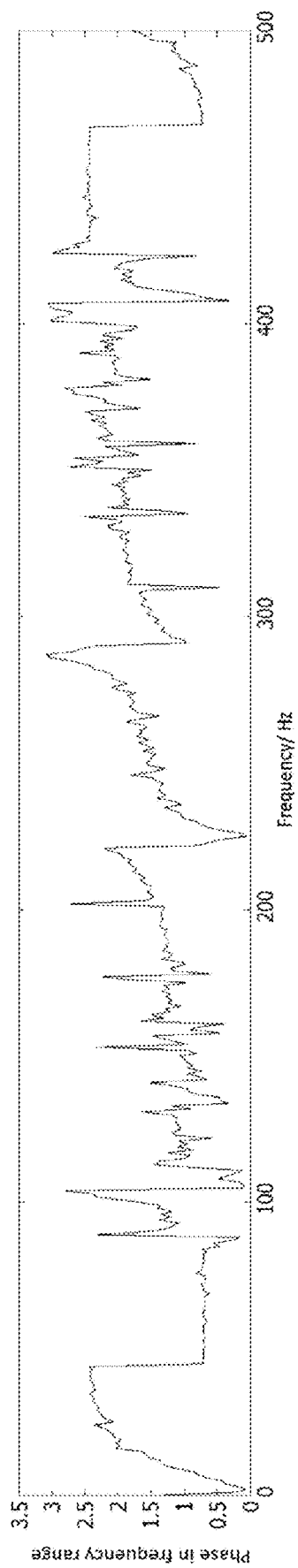
FIG. 7 shows an example of a phase spectrum of a compressor with a fixed-speed compressor drive during load run (FIG. 7a), idling (FIG. 7b) and standstill (FIG. 7c)
Figure 7B:
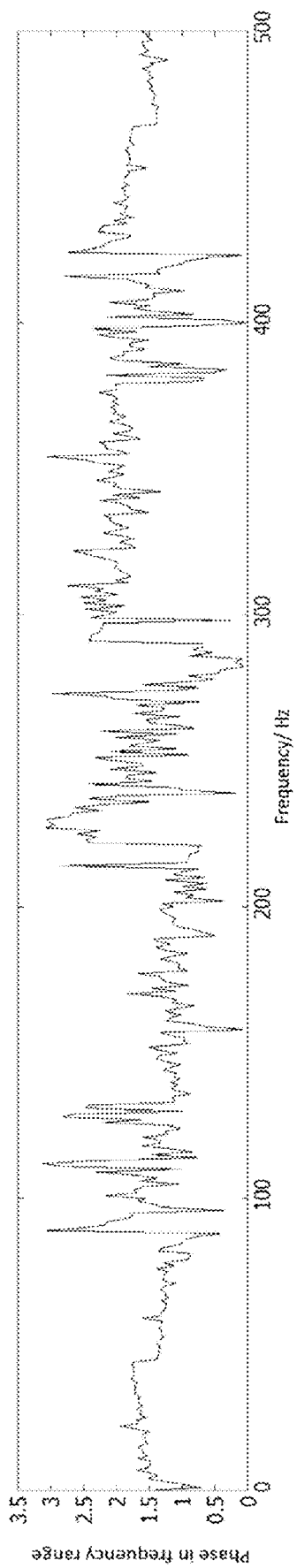
Figure 7C:
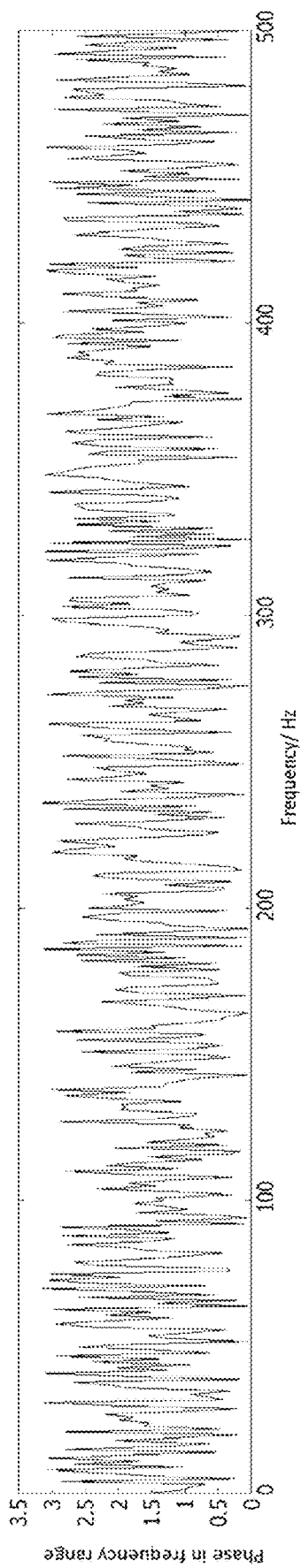

FIG. 7 shows an example of a phase spectrum of a compressor 1 with a fixed-speed compressor drive 2 in the "standstill", "idling" and "load run" operating states. FIG. 7a shows the "load run" operating state of compressor 1 with a fixed-speed compressor drive 2. FIG. 7b shows the "idling" operating state of compressor 1 with fixed-speed compressor drive 2. Finally, FIG. 7c shows the "standstill" operating state of compressor 1 with a fixed-speed compressor drive 2.

It can be seen from FIG. 7 that the phase spectra differ significantly in the individual operating states. It is also possible that for the detection of the operating state the phase spectrum of the magnetic field is evaluated in a defined time range, for example in a time range from 200 ms to 20 s, preferably 300 ms to 10 s, particularly preferably 500 ms to 5 s, especially 750 ms to 3 s, in particular 1 s (not shown in FIG. 7).

An automatic evaluation of the phase spectrum is performed, for example, by forming the variance of the phase spectrum in the range from 0 Hz to 80 Hz (not shown in FIG. 7). This variance is fed to a clustering algorithm. The clustering algorithm defines clusters using thresholds or using statistical techniques such as k-means or neural networks. Based on this clustering, a classification method is carried out, wherein each cluster is assigned an operational state based on the amount of variance. For example, the "standstill" operating state is assigned a very high variance, the "load run" operating state is assigned a medium variance and the "idling" operating state is assigned a very low variance. It is also possible that the classification method is performed without prior clustering.

From the spectrum of FIG. 7 it is visually apparent that the spectrum range from 240 Hz to 260 Hz is also suitable for clustering and thus for detecting the operating state. In the example shown in FIG. 7, the range from 240 Hz to 260 Hz corresponds to the frequency range of the chamber frequency of a block with 5 compression chambers. Consequently, it is also possible to use the analysis of the magnetic field to analyze the repercussions of the compression process on the power grid.

Figure 8:
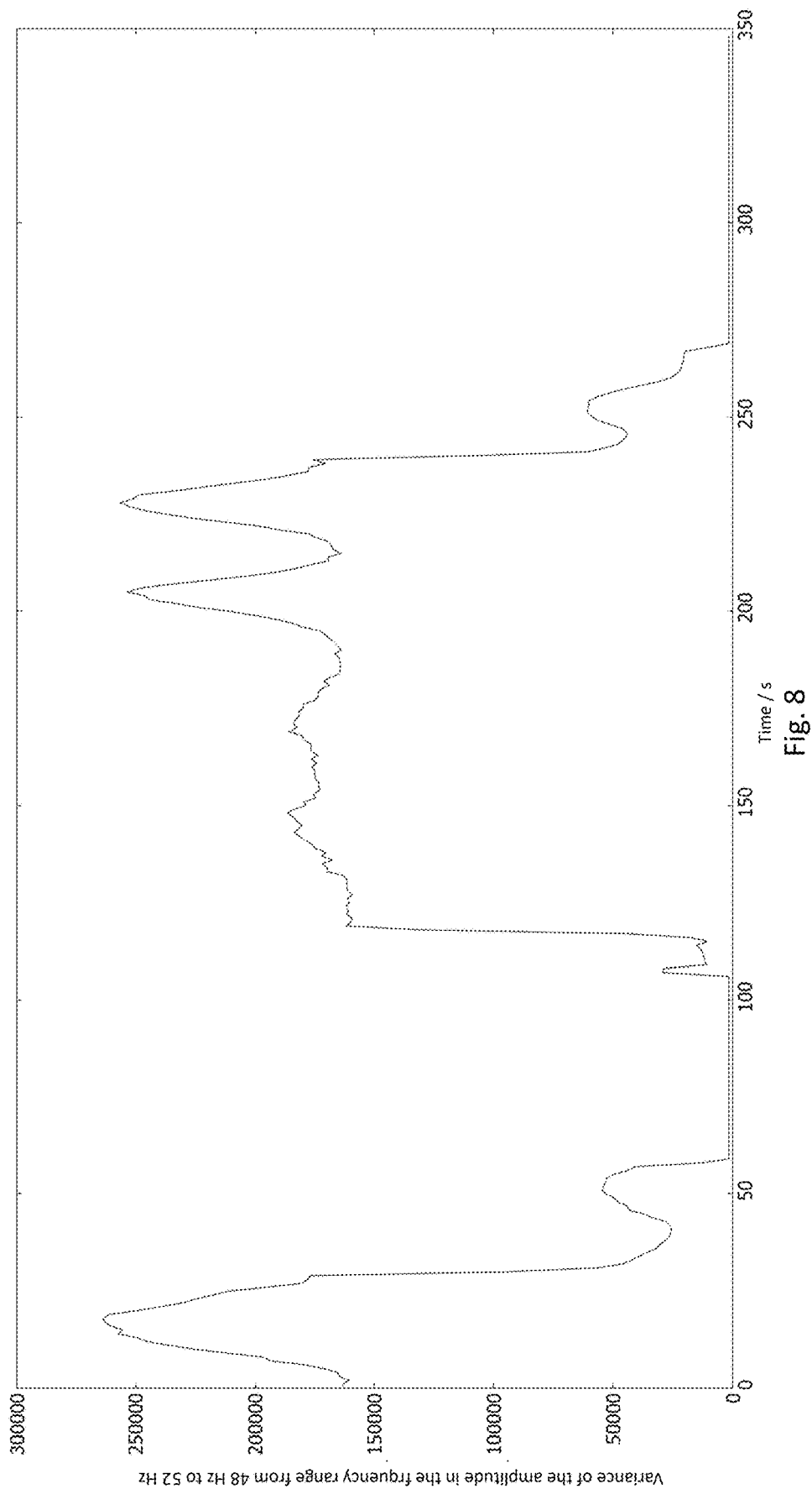
FIG. 8 shows the detection of the operating state from the variance of the amplitude in the frequency range in an interval ±2 Hz around the excitation frequency of 50 Hz.

FIG. 8 shows a detection of the operating state from the variance of the amplitude in the frequency range in an interval ±2 Hz around an excitation frequency of 50 Hz. Here, thresholding is used to detect the operating state. In the embodiment shown in FIG. 8, a variance greater than 10000 is defined for the detection of the "idling" operating state and a variance greater than 100000 is defined for the detection of the "load run" operating state. In FIG. 8, the variance has been normalized to the mean value of the examined amplitude spectrum in the respective time window. In FIG. 8, this time window is one second.

FIG. 9 shows the underlying data for detecting the operating state by means of two different procedures from the recorded magnetic flux density (FIG. 9a). Two time ranges are defined by way of example in FIG. 9a. The amplitude spectrum after a Fourier analysis (here Fast Fourier Transform FFT) is shown for these two time ranges in FIG. 9b and FIG. 9c. The two time ranges differ with regard to the operating state of the compressor: "Load run" (FIG. 9b) and "idling" (FIG. 9c).

In particular, FIG. 9 shows another possibility for detecting the operating state, wherein the magnetic field of all phases L1, L2, L3 of the power supply cable 4 is detected. This method is suitable both for compressors 1 with frequency converter 10 (see for example FIG. 2 or FIG. 5) and for compressors 1 without frequency converter 10 (see for example FIG. 1 or FIG. 4). Based on the magnetic flux density detected by means of the detection element 3 (shown by way of example in FIG. 9a), the amplitude spectrum can be calculated for certain time sections. This is exemplified for a 1 s time interval in the load run in FIG. 9b and for a 1 s time interval in the idling operation in FIG. 9c. Based on the amplitude values of the frequency 50 Hz (shown by way of example in FIG. 10a) the operating state (shown by way of example in FIG. 10b) is determined by means of threshold values. Since this application example involves a fixed-speed compressor which is operated in a power grid with 50 Hz network frequency, the amplitude values of the 50 Hz frequency are particularly relevant for this application example.

Figure 10A:
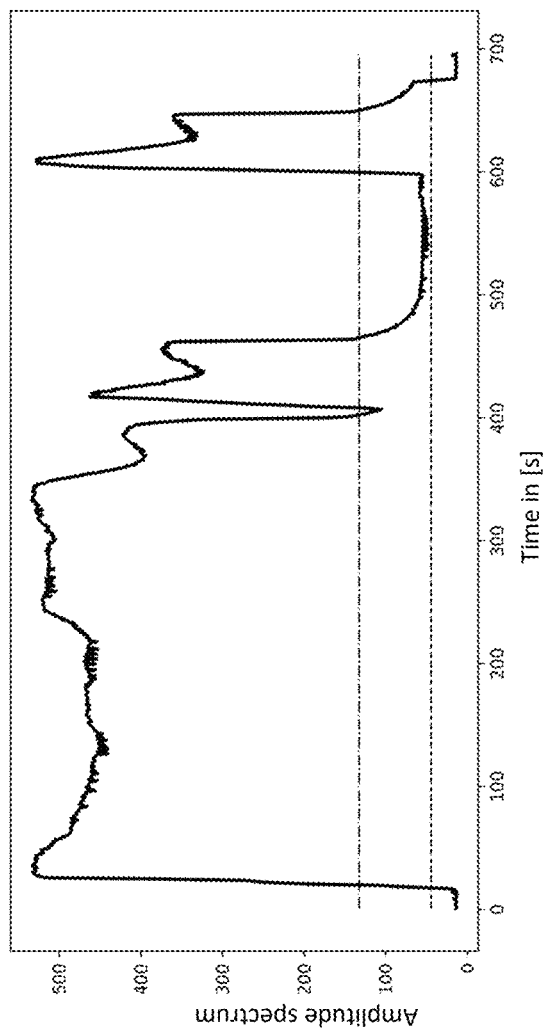
FIGS. 10a and 10b shows a detection of the operating state based on the amplitude of an FFT for the mains frequency.
Figure 10B:
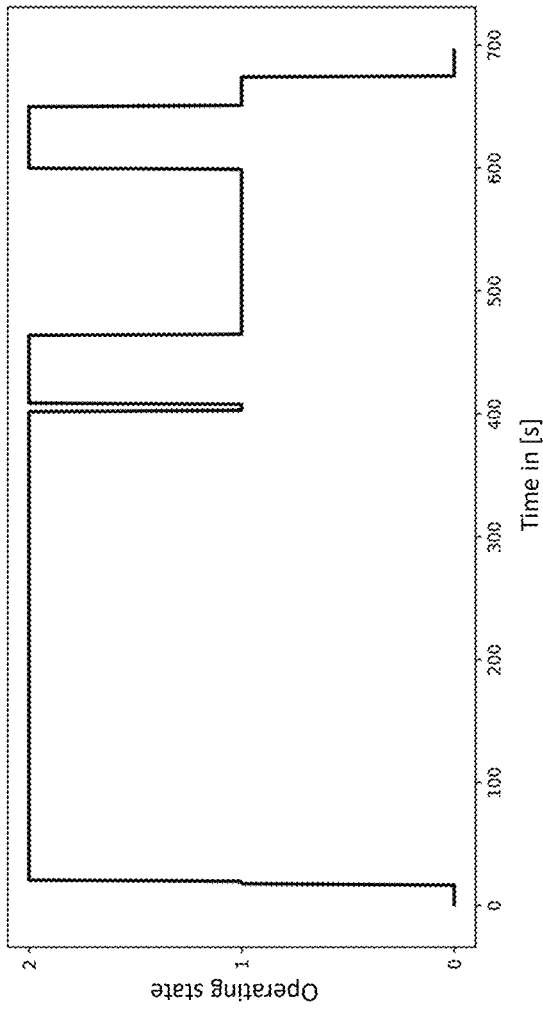

Two different procedures can be used to determine the threshold values. For the first procedure, the operating state must be known at a point in time of the measurement (e.g. "idling" at 530 s in FIG. 9 or 10). For this point in time the amplitude value of the frequency at 50 Hz is known. This amplitude value is multiplied by a first safety factor (for example 0.8) to obtain the lower threshold value. Multiplication by a second safety factor (for example 1.5) defines the upper threshold. If at any time the amplitude value of the frequency at 50 Hz is greater than both threshold values, the operating state is "load run". If at any time the amplitude value of the frequency at 50 Hz is less than both threshold values, the operating state is "standstill". If at any time the amplitude value of the frequency at 50 Hz is between the two threshold values, the operating state is "idling". Using these two threshold values, the operating state can be determined for each time step, this is shown in FIG. 10b.

The second procedure for determining the threshold values runs automatically and therefore does not require any information about an operating state at a specific point in time. In both the "idling" and "load run" operating states, the excitation frequency of the magnetic field is more than 6 Hz. In the "standstill" operating state, on the other hand, excitation frequencies are detected which are below 6 Hz. Therefore, times with an excitation frequency lower than 6 Hz can be defined as operating state. Before a compressor changes to the "standstill" operating state, the "idling" operating state is run through for a few seconds. A similar behavior occurs when starting the compressor from "standstill" via "idling" to "load run". This phenomenon can be used to obtain amplitude value of frequency at 50 Hz for an "idling" operating state. In the second procedure, the mean value of the amplitude value of the frequency at 50 Hz of 4 time steps before a known "standstill" operating state is formed. This mean value is multiplied by a first safety factor (for example 0.8) to obtain the lower threshold value. Multiplication by a second safety factor (for example 1.5) defines the upper threshold. If at any time the amplitude value of the frequency at 50 Hz is greater than both threshold values, the operating state is "load run". If at any time the amplitude value of the frequency at 50 Hz is less than both threshold values, the operating state is "standstill". If at any time the amplitude value of the frequency at 50 Hz is between the two threshold values, the operating state is "idling". Using these two threshold values, the operating state can be determined for each time step, this is shown in FIG. 10b.

FIGS. 11a and 11b show another way of detecting the operating state, in which the magnetic field of all phases L1, L2, L3 of the power supply cable 4 is detected. This method is suitable both for compressors 1 with frequency converter 10 (see for example FIG. 2 or FIG. 5) and for compressors 1 without frequency converter 10 (see for example FIG. 1 or FIG. 4).

Based on the phase spectrum in the frequency range between 1 and 80 Hz (see FIG. 7), all values of the phase spectrum can be summed up in time ranges of, for example, 1 s.

The difference of these summed values of the arguments is formed. If this difference is >0.1 rad, this difference is limited to 0.1 rad. A new time series of the differences is created.

After smoothing the time series of differences (for example by forming the mean value over three adjacent values), threshold values can be defined for a change of the "idling", "load run" and "standstill" operating states. This time series of differences is called the path in the phase spectrum. This course of the path in the phase spectrum and the associated threshold values are shown in FIG. 11a. The operating state of the compressor determined from this is shown in FIG. 11b.

Figure 12:
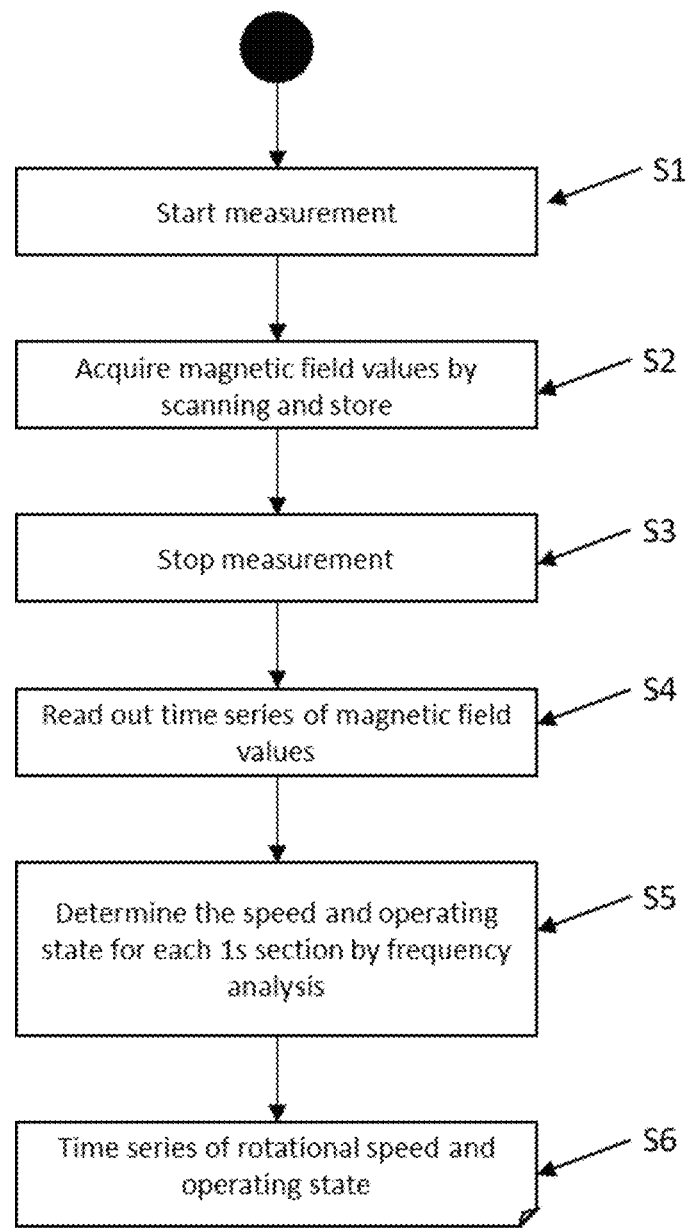
FIG. 12 shows a possible sequence of the method according to the invention.

FIG. 12 shows a possible sequence of the method according to the invention. In a first step, S1, the measurement is started. Then, in a second step, S2, the magnetic field values are acquired by scanning and stored. Subsequently, in a third step, S3, the measurement is stopped. In a fourth step, S4, the time series of the magnetic field values is read out. In a fifth step, S5, the rotational speed and the operating state are determined in sections of one second at a time by frequency analysis. In a sixth step, S6, time series of rotational speed and operating state are obtained.

Individual application examples are discussed in more detail below with reference to FIGS. 13 to 16.

Application Example 1

Figure 13:
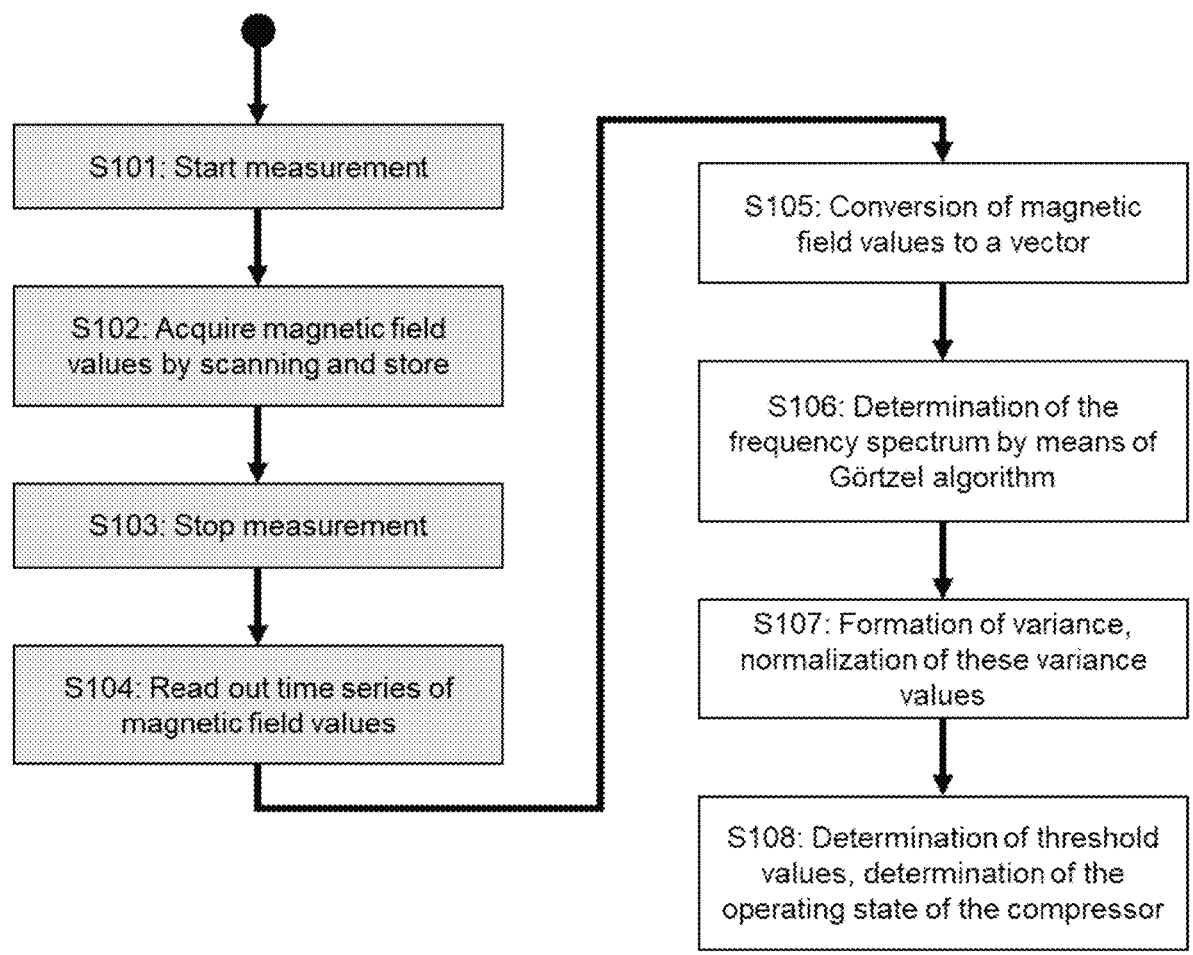
FIG. 13 shows a first possible implementation of the method according to the invention.

FIG. 13 shows a first possible implementation of the method according to the invention. In a first step, S101, the measurement is started. Then, in a second step, S102, the magnetic field values are acquired by scanning and stored. Then, in a third step, S103, the measurement is stopped. In a fourth step, S104, the time series of the magnetic field values is read out. In a fifth step, S105, the X, Y and Z values of the magnetic flux density (present as a time series) are further used. For each time point in the time series, the X, Y and Z values are combined into a vector and this vector is mapped to a scalar for that time point. Subsequently, the determination of the frequency spectrum on the time series of scalars is carried out by performing a frequency analysis with the Görtzel algorithm for each 1 s segment of the above time series, S106. Then, the variance of the amplitudes of the frequency spectrum between 48 Hz and 52 Hz is formed. An additional normalization of the variance value is performed using the average of the amplitudes, S107. The normalized variance values are shown in FIG. 8, and the time window is one second. Finally, threshold values for the normalized variance values are determined in order to distinguish the "load run", "idling" and "standstill" operating states, S108. In the embodiment illustrated in FIG. 8, a variance greater than 10000 is defined for detecting the "idling" operating state and a variance greater than 100000 is defined for detecting the "load run" operating state.

Application Example 2

Figure 14:
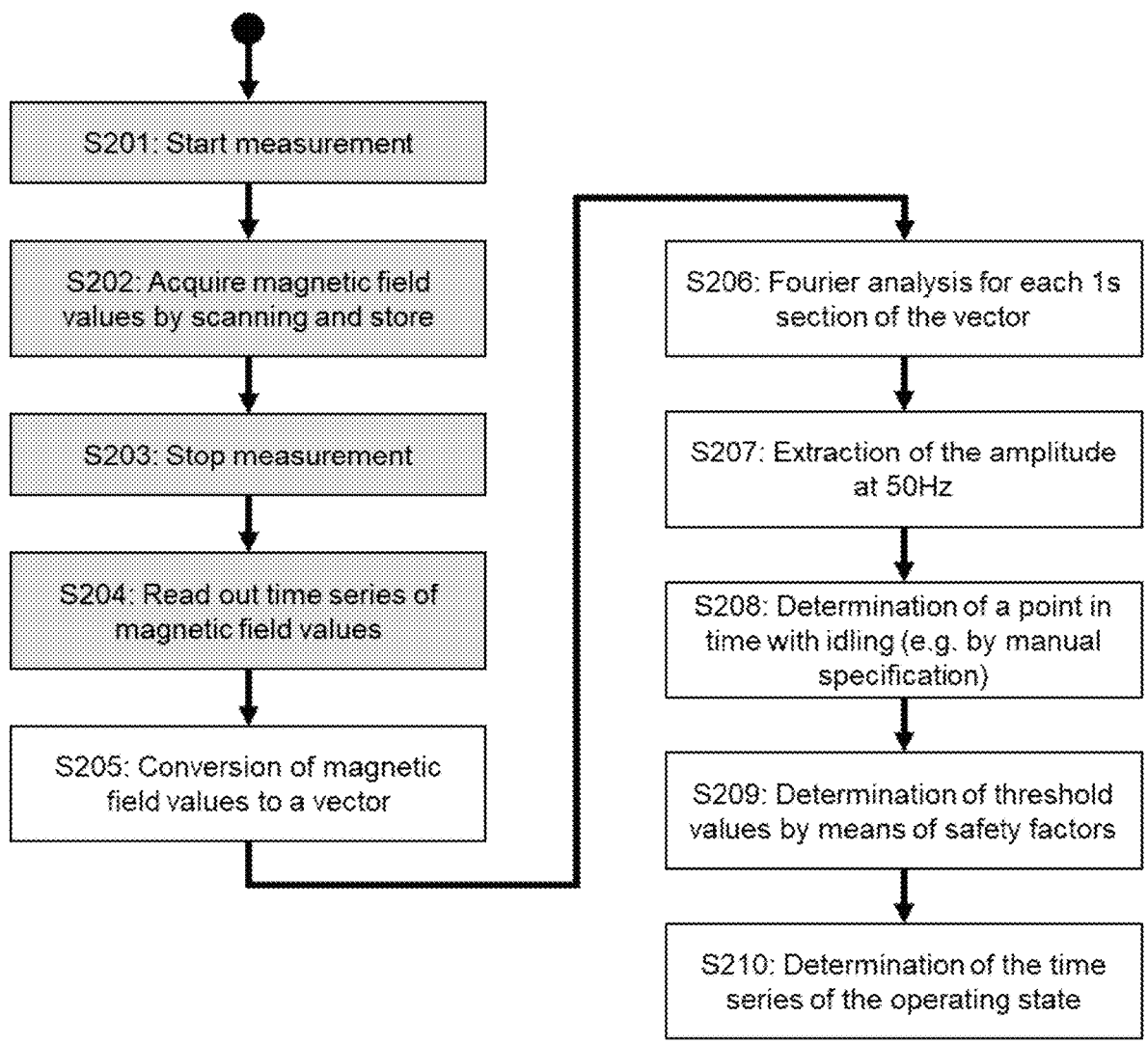
FIG. 14 shows a second possible implementation of the method according to the invention.

FIG. 14 shows a second possible implementation of the method according to the invention. In a first step, S201, the measurement is started. Then, in a second step, S202, the magnetic field values are acquired by scanning and stored. Then, in a third step, S203, the measurement is stopped. In a fourth step, S204, the time series of the magnetic field values is read out. In a fifth step, S205, the X, Y and Z values of the magnetic flux density (present as a time series) are further used. For each time point in the time series, the X, Y and Z values are combined into a vector and this vector is mapped to a scalar for that time point. The values of this scalar are shown in FIG. 9a. In a sixth step, S206, the frequency spectrum is determined on the time series of scalars by performing a frequency analysis using Fourier analysis (FFT) for each 1 s segment of the above time series and calculating the amplitude spectrum. Values of the amplitude spectrum are shown in FIGS. 9b and 9c for one second "load run" and one second "idling". Then, the extraction of the amplitude at 50 Hz (excitation frequency) is performed for each 1 s interval, S207. The amplitude values at 50 Hz are shown as a time series in FIG. 10a. Thereafter, a time point with the compressor operating state "idling" can be identified by manual specification, S208. In FIG. 10a, for example, at 530 s. Based on the magnitude value of the amplitude of the Fourier analysis at 50 Hz of the known time point "idling", the threshold value SW1 is formed by means of multiplication by a safety factor (e.g. 0.8) and the threshold value SW2 is formed by means of a second safety factor (e.g. 1.5), S209. The safety factors are determined by measuring and analyzing a group of compressors. These two threshold values are shown as dashed lines in FIG. 10a. Finally, all magnitude values of the amplitudes of the Fourier analysis at 50 Hz that are above the two thresholds are assigned to the "load run" operating state, all values below the two thresholds are assigned to the "standstill" operating state and all values between the two thresholds are assigned to the "idling" operating state, S210. This results in the curve of the operating states of the compressor, shown in FIG. 10b.

Application Example 3

Figure 15:
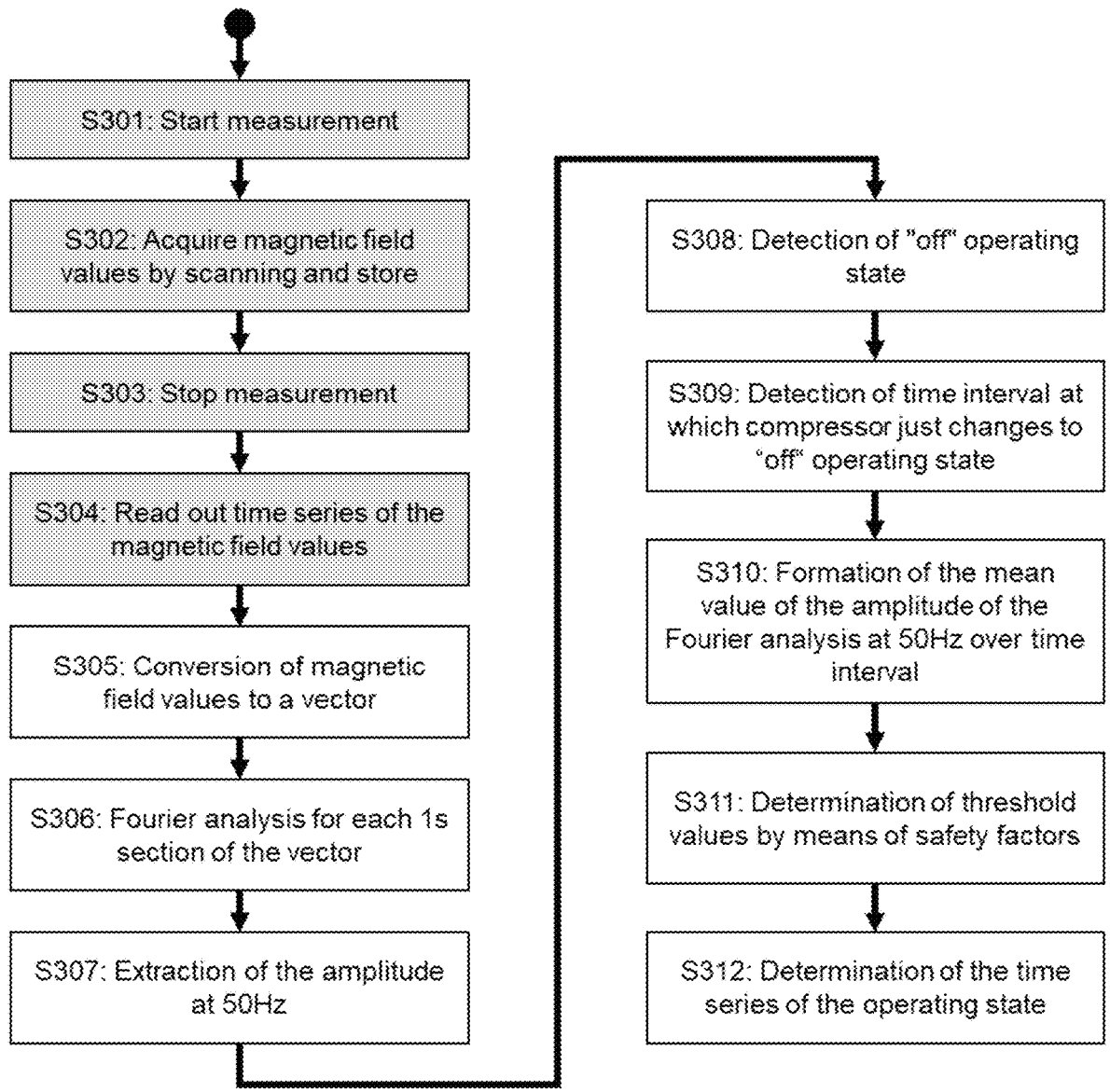
FIG. 15 shows a third possible implementation of the method according to the invention.

FIG. 15 shows a third possible implementation of the method according to the invention. In a first step, S301, the measurement is started. Then, in a second step, S302, the magnetic field values are acquired by scanning and stored. Then, in a third step, S303, the measurement is stopped. In a fourth step, S304, the time series of the magnetic field values is read out. In a fifth step, S305, the X, Y and Z values of the magnetic flux density (present as a time series) are further used. For each time point in the time series, the X, Y and Z values are combined into a vector and this vector is mapped to a scalar for that time point. The values of this scalar are shown in FIG. 9a. In a sixth step, S306, the frequency spectrum is determined on the time series of scalars by performing a frequency analysis with Fourier analysis (here using FFT) for each 1 s segment of the above time series and calculating the amplitude spectrum. Values of the amplitude spectrum are shown in FIGS. 9b and 9c for one second "load run" and one second "idling". Then, the extraction of the amplitude at 50 Hz (excitation frequency) is performed for each 1 s interval, S307. The amplitude values at 50 Hz are shown as a time series in FIG. 10a. In step S308, the "standstill" operating state of the compressor can be detected. In the "standstill" operating state of the compressor, the Fourier analysis delivers very small frequencies (<6 Hz) as a frequency with maximum amplitude greater than 0 Hz (DC component). Time intervals in which this is the case can be automatically assigned to the "standstill" operating state. In step 309, a time interval is searched for at which the compressor has just changed to the known "standstill" operating state determined by the above method step (e.g. time point 680 s in FIG. 10a). A few seconds before the determined time interval, compressors may be assumed to be in the "idling" operating state. Therefore, in step S310, the average of the magnitude values of the amplitude of the Fourier analysis at 50 Hz over 4 seconds before the time interval in which the system is safely in the "standstill" state is formed. In FIG. 10a, this is the mean value of the values 676 s-679 s. Subsequently, starting from the determined mean value, the threshold value SW1 is formed by means of multiplication by a safety factor (e.g. 0.8) and the threshold value SW2 is formed by means of a second safety factor (e.g. 1.5), S311. The safety factors are determined by measuring and analyzing a group of compressors. These two threshold values are shown in FIG. 10a. Finally, all the magnitude values of the amplitudes of the Fourier analysis at 50 Hz which are above the two thresholds are assigned to the "load run" operating state, all the values below the two thresholds are assigned to the "standstill" operating state and all the values between the two thresholds are assigned to the "idling" operating state, S312. This results in the curve of the operating states shown in FIG. 10b.

Application Example 4

Figure 16:
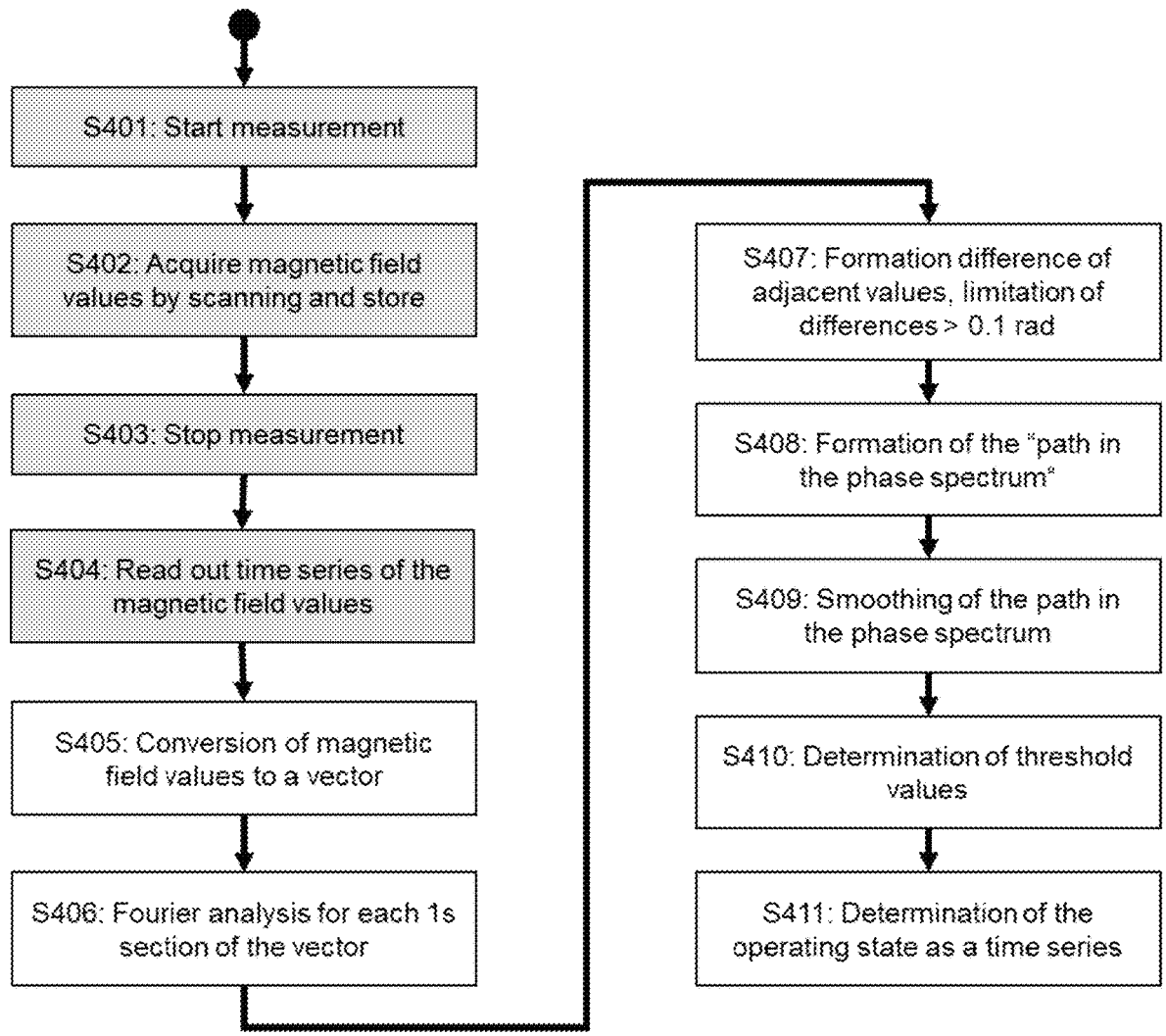
FIG. 16 shows a fourth implementation of the method according to the invention.

FIG. 16 shows a fourth possible implementation of the method according to the invention. In a first step, S401, the measurement is started. Then, in a second step, S402, the magnetic field values are acquired by scanning and stored. Then, in a third step, S403, the measurement is stopped. In a fourth step, S404, the time series of the magnetic field values is read out. In a fifth step, S405, the X, Y and Z values of the magnetic flux density (present as a time series) are further used. For each time point in the time series, the X, Y and Z values are combined into a vector and this vector is mapped to a scalar for that time point. In a sixth step, S406, the frequency spectrum is determined on the time series of scalars by performing a frequency analysis with Fourier analysis (here using FFT) for each 1 s segment of the above time series and calculating the argument/phase in rad. In a seventh step, S407, the difference of two adjacent values of the arguments is formed. If this difference is >0.1 rad, this difference is limited to 0.1 rad. A new time series of the differences is formed. Subsequently, S408, the formation of the sum of all differences of the arguments in rad in the frequency range of 1-80 Hz takes place, this is called the distance in the phase spectrum. In the ninth step, S409, the curve of the distance in the phase spectrum is smoothed (for example, by taking the mean value of 3 values of the distance in the phase spectrum). This distance in the phase spectrum is shown in FIG. 11a. Next, threshold values are set to distinguish the operating states, threshold values are shown as a dashed line in FIG. 11a. In the last step, S411, all values of the distance in the phase spectrum which lie above the two threshold values are assigned to the "standstill" operating state, all values below the two threshold values are assigned to the "load running" operating state and all values between the two threshold values are assigned to the "idling" operating state. This results in the curve of the operating states as a time series of the compressor in FIG. 11b.

LIST OF REFERENCE NUMERALS

L1 Phase 1
L2 Phase 2
L3 Phase 3
1 Compressor
2 Compressor drive, for example electric motor
3 Detection element
4 Power supply cable
5 Machine interior
6 Control cabinet
7 Mains contactor
8 Motor winding
9 Terminal box of the electric motor
10 Frequency inverter

The invention claimed is:

1. A method for contactless determination of an operating state of a compressor, the method comprising:
detecting a magnetic field over a time range using a detection element, the magnetic field generated by current from at least one phase of a power supply of the compressor;
determining a frequency spectrum of the detected magnetic field over the time range; and
determining the operating state of the compressor automatically by analyzing the frequency spectrum in a clustering procedure comprising a statistical method.

2. The method of claim 1, wherein:
the method further comprising attaching the detection element to all phases of the power supply; and
detecting the magnetic field further comprises detecting the magnetic field generated by current from all phases of the power supply.

3. The method of claim 1, wherein the time range is 200 ms to 20 s.

4. The method of claim 1, wherein the statistical method comprises k-means.

5. The method of claim 1, wherein detecting the magnetic field comprises detecting a magnetic field strength or detecting a magnetic flux density.

6. The method of claim 5, wherein the method further comprises:
attaching the detection element to the at least one phase of the power.

7. The method of claim 1, wherein determining the frequency spectrum comprises analyzing a time course of the magnetic field.

8. The method of claim 7, wherein analyzing the time course of the magnetic field comprises using a Fourier analysis, a wavelet analysis, or a Görtzel algorithm.

9. The method of claim 1, wherein the method further comprises:
analyzing individual frequency components in the frequency spectrum to determine a frequency of the magnetic field; and
determining a fundamental frequency of the current of the at least one phase of the power supply based on the frequency of the magnetic field.

10. The method of claim 9, wherein the method further comprises determining a rotational speed of the compressor from the determined fundamental frequency of the current.

11. A method for contactless determination of an operating state of a compressor, the method comprising:
detecting a magnetic field over a time range using a detection element, the magnetic field generated by current from at least one phase of a power supply of the compressor;
determining a frequency spectrum of the detected magnetic field over the time range; and
determining the operating state of the compressor automatically by analyzing the frequency spectrum in a classification procedure.

12. The method of claim 11, wherein analyzing the frequency spectrum in a classification procedure comprises:
defining a plurality of classifications for the operating state; and
analyzing the frequency spectrum to identify one of the classifications for the operating state.

13. The method of claim 12, wherein the plurality of classifications comprises standstill, idling, and load running.

14. The method of claim 12, wherein:
analyzing the frequency spectrum in a classification procedure further comprises associating each classification with a level of a statistical parameter; and
analyzing the frequency spectrum comprises using the frequency spectrum to determine a value for the statistical parameter.

15. The method of claim 14, wherein the statistical parameter comprises variance, average, or mode value.

16. A method for contactless determination of an operating state of a compressor, the method comprising:
detecting a magnetic field over a time range using a detection element, the magnetic field generated by current from at least one phase of a power supply of the compressor;
determining a frequency spectrum of the detected magnetic field over the time range;
calculating an amplitude spectrum using the frequency spectrum;
extracting amplitude values from the amplitude spectrum at an excitation frequency of the compressor;
manually identifying a time point when the operating state of the compressor is idling;
obtaining a magnitude value of the amplitude at the excitation at the known point in time; and
using the obtained magnitude value of the amplitude to define threshold amplitude magnitude values for the operating state of the compressor.

17. The method of claim 16, wherein determining the frequency spectrum comprises:
determining a time series of magnetic field values from the detected magnetic field over the time range;
combining X, Y, and Z values for each time point in the time series into a vector;
mapping the vector for each time point to a scalar to form a time series of scalars;
performing a frequency analysis using a Fourier analysis on the time series of scalars to determine the frequency spectrum.

18. The method of claim 16, wherein using the obtained magnitude value of the amplitude to define threshold amplitude magnitude values comprises:
multiplying the obtained magnitude value by a first safety factor to obtain a lower threshold value;
multiplying the obtained magnitude value by a second safety factor to obtain an upper threshold value; and
assigning all amplitude magnitude values from the amplitude spectrum at all time points to an operating state based on a comparison of each amplitude magnitude value to the lower threshold value and the upper threshold value.

19. The method of claim 18, wherein:
the first safety factor comprises 0.8; and
the second safety factor comprises 1.5.

20. The method of claim 18, wherein assigning all amplitude magnitude values to an operating state comprises:
assigning a load run operating state to all amplitude magnitude values that are greater than the lower threshold value and the upper threshold value;
assigning an idling operating state to all amplitude magnitude values that are greater than the lower threshold value and less than the upper threshold value; and
assigning a standstill operating state to all amplitude magnitude values less than the lower threshold value and the upper threshold value.

* * * * *